(12) United States Patent
Mullins

(10) Patent No.: US 10,534,896 B2
(45) Date of Patent: *Jan. 14, 2020

(54) AUTHORISING USE OF A COMPUTER PROGRAM

(71) Applicant: FLEXERA SOFTWARE LLC, Itasca, IL (US)

(72) Inventor: Leo Joseph Mullins, Currambine (AU)

(73) Assignee: FLEXERA SOFTWARE LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/802,192

(22) Filed: Nov. 2, 2017

(65) Prior Publication Data

US 2019/0005209 A1    Jan. 3, 2019

Related U.S. Application Data

(63) Continuation of application No. 15/332,761, filed on Oct. 24, 2016, now Pat. No. 9,817,955, which is a
(Continued)

(30) Foreign Application Priority Data

Mar. 28, 2000    (AU) ...................... PQ6544

(51) Int. Cl.
*G06F 21/12*    (2013.01)
*G06F 21/31*    (2013.01)
(Continued)

(52) U.S. Cl.
CPC ............ *G06F 21/121* (2013.01); *G06F 21/10* (2013.01); *G06F 21/31* (2013.01); *G06F 21/44* (2013.01);
(Continued)

(58) Field of Classification Search
CPC ........ G06F 21/121; G06F 21/10; G06F 21/31; G06F 21/44; G06F 2221/0713
See application file for complete search history.

(56) References Cited

U.S. PATENT DOCUMENTS

5,023,907 A * 6/1991 Johnson ................ G06F 21/105
710/200
5,047,928 A * 9/1991 Wiedemer ............... G06F 21/10
380/230
(Continued)

FOREIGN PATENT DOCUMENTS

EP    1113381 A1 *   7/2001   .......... G06F 11/3466

OTHER PUBLICATIONS

U.S. Appl. No. 15/332,761, filed Oct. 24, 2016, Mullins.
(Continued)

*Primary Examiner* — Sher A Khan
(74) *Attorney, Agent, or Firm* — Barnes & Thornburg LLP

(57) ABSTRACT

A method of authorising use of a computer program only able to be used when an authorised message is received from an authorising system includes providing an authorisation system, making a request to use a computer program, signalling the request to the authorisation system, the authorisation system recording the use of the computer program and providing the authorisation message to the computer program upon receipt of the authorisation message the computer program may be used.

7 Claims, 5 Drawing Sheets

Related U.S. Application Data continuation of application No. 14/450,929, filed on Aug. 4, 2014, now Pat. No. 9,477,819, which is a continuation of application No. 13/751,297, filed on Jan. 28, 2013, now Pat. No. 8,799,667, which is a continuation of application No. 12/730,679, filed on Mar. 24, 2010, now Pat. No. 8,365,303, which is a continuation of application No. 10/240,207, filed as application No. PCT/AU01/00350 on Mar. 28, 2001, now Pat. No. 7,694,345.

(51) Int. Cl.
    *G06F 21/10*     (2013.01)
    *G06Q 20/08*     (2012.01)
    *G06Q 20/12*     (2012.01)
    *G06Q 20/40*     (2012.01)
    *G06F 21/44*     (2013.01)

(52) U.S. Cl.
    CPC ....... *G06Q 20/085* (2013.01); *G06Q 20/1235* (2013.01); *G06Q 20/40* (2013.01); *G06F 2221/0713* (2013.01)

(56) References Cited

U.S. PATENT DOCUMENTS

| | | | |
|---|---|---|---|
| 5,138,712 A | 8/1992 | Corbin | |
| 5,204,897 A | 4/1993 | Wyman | |
| 5,295,244 A | 3/1994 | Dev et al. | |
| 5,343,527 A | 8/1994 | Moore | |
| 5,553,143 A | 9/1996 | Ross et al. | |
| 5,590,266 A | 12/1996 | Carson et al. | |
| 5,654,746 A * | 8/1997 | McMullan, Jr. | A63F 13/12 348/E7.056 |
| 5,671,412 A | 9/1997 | Christiano | |
| 5,699,428 A * | 12/1997 | McDonnal | G06F 21/602 713/165 |
| 5,745,879 A | 4/1998 | Wyman | |
| 5,758,068 A | 5/1998 | Brandt et al. | |
| 5,758,069 A | 5/1998 | Olsen | |
| 5,825,883 A | 10/1998 | Archibald | |
| 5,845,067 A * | 12/1998 | Porter | G06F 17/22 726/4 |
| 5,878,258 A | 3/1999 | Pizi | |
| 5,880,720 A * | 3/1999 | Iwafune | H04N 7/17318 348/E7.071 |
| 5,892,828 A * | 4/1999 | Perlman | H04L 63/083 713/183 |
| 5,951,648 A * | 9/1999 | Kailash | G06F 9/542 709/235 |
| 6,014,666 A * | 1/2000 | Helland | G06F 9/468 |
| 6,023,766 A | 2/2000 | Yamamura | |
| 6,101,607 A * | 8/2000 | Bachand | G06F 21/629 719/328 |
| 6,119,109 A | 9/2000 | Muratani et al. | |
| 6,122,663 A * | 9/2000 | Lin | G06F 9/50 709/224 |
| 6,188,995 B1 | 2/2001 | Garst | |
| 6,226,752 B1 | 5/2001 | Gupta | |
| 6,263,340 B1 | 7/2001 | Green | |
| 6,470,450 B1 | 10/2002 | Langford | |
| 6,510,350 B1 | 1/2003 | Steen, III | |
| 6,510,466 B1 * | 1/2003 | Cox | H04L 67/1095 709/229 |
| 6,564,247 B1 | 5/2003 | Todorov | |
| 6,578,199 B1 * | 6/2003 | Tsou | G06F 8/61 717/174 |
| 6,584,454 B1 | 6/2003 | Hummel, Jr. | |
| 6,775,298 B1 | 8/2004 | Aggarwal | |
| 6,816,904 B1 | 11/2004 | Ludwig | |
| 6,823,452 B1 * | 11/2004 | Doyle | G06Q 20/202 705/21 |
| 6,948,122 B2 | 9/2005 | Matsumoto | |
| 6,986,039 B1 | 1/2006 | Leah | |
| 7,076,784 B1 * | 7/2006 | Russell | G06F 9/466 719/315 |
| 7,613,659 B1 | 11/2009 | Hoffman | |
| 7,694,345 B2 | 4/2010 | Mullins | |
| 7,818,423 B1 | 10/2010 | Philyaw | |
| 7,882,032 B1 | 2/2011 | Hoffman | |
| 8,365,303 B2 | 1/2013 | Mullins | |
| 8,589,777 B1 | 11/2013 | Baer | |
| 8,713,641 B1 | 4/2014 | Pagan | |
| 8,799,667 B2 | 8/2014 | Mullins | |
| 9,477,819 B2 | 10/2016 | Mullins | |
| 9,817,955 B2 | 11/2017 | Mullins | |
| 2001/0011222 A1 | 8/2001 | McLauchlin | |
| 2001/0011238 A1 | 8/2001 | Eberhard | |
| 2001/0025311 A1* | 9/2001 | Arai | G06F 21/6218 709/225 |
| 2002/0007343 A1* | 1/2002 | Oyama | G06F 21/33 705/39 |
| 2002/0013834 A1* | 1/2002 | Esakov | G06F 16/954 709/223 |
| 2002/0129239 A1* | 9/2002 | Clark | H04L 63/02 713/153 |
| 2003/0212806 A1* | 11/2003 | Mowers | G06F 21/31 709/229 |
| 2005/0021978 A1* | 1/2005 | Bhat | G06F 21/6227 713/182 |

OTHER PUBLICATIONS

U.S. Appl. No. 14/450,929, filed Aug. 4, 2014, Mullins.
U.S. Appl. No. 13/751,297, filed Jan. 28, 2013, Mullins.
U.S. Appl. No. 12/730,679, filed Mar. 24, 2010, Mullins.
U.S. Appl. No. 10/240,207, filed Apr. 23, 2003, Mullins.

* cited by examiner

AUTHORISING USE OF A COMPUTER PROGRAM

This application is a continuation of U.S. Ser. No. 15/332,761, filed 24 Oct. 2016, which is a continuation of U.S. Ser. No. 14/450,929, filed 4 Aug. 2014, which is a continuation of U.S. Ser. No. 13/751,297, filed 28 Jan. 2013, which is a continuation of U.S. Ser. No. 12/730,679, filed 24 Mar. 2010, which is a continuation of U.S. Ser. No. 10/240,207, filed 23 Apr. 2003, which is a national stage application of PCT/AU2001/00350, filed 28 Mar. 2001, which claims benefit of PQ 6544, filed 28 Mar. 2000 in Australia and which applications are incorporated herein by reference. To the extent appropriate, a claim of priority is made to each of the above disclosed applications.

FIELD OF THE INVENTION

The present invention relates to authorising use of a computer program, in particular the present invention relates to a method of authorising use of a computer program, a computer configured to authorise the use of a computer program and a computer readable media on which is stored computer software for authorising use of a computer program.

BACKGROUND OF THE INVENTION

There is an increasing need for securing and protection of computer programs and other digital products. This is reflected in an increasing demand for a "pay as you use" payment arrangement for licensed use of computer software. It is known for a server to provide application software to a plurality of client's machines. Under this model it is possible to provide a "pay as you use" method of software licensing. Current pricing models used for the payment of software applications are based on per user and seat licensing agreements that are complex, restrictive and inefficient, especially for client server and application service provider software delivery. "Pay as you use" pricing is demanded by software users for its simplicity, cost effectiveness and flexibility.

There is therefore a need for an alternative method of providing a software licensing system that allows for each user of the software to correspond a payment for that use. The licensed software needs to be able to be prevented from use unless authorised, to allow for inter alia payment for using the software.

SUMMARY OF THE PRESENT INVENTION

An object of the present invention is to provide a method of authorising use of a computer program in a manner suitable for implementing inter alia a "pay as you use" licensing system.

According to the present invention there is provided a method of authorising use of a computer program, said method including the steps of:
  providing an authorisation system;
  recording an identifier of a computer program to be authorised for use with the authorisation system;
  a user registering with the authorisation system and receiving a user identification from the authorisation system;
  the user making a request to use the computer program;
  the computer program identifier and user identification being sent to the authorisation system in a login request message;
  the authorisation system verifying the identity of the user from the user login identification and checking that the user is authorised to use the computer program identified by the computer program identifier;
  the authorisation system recording the information sent with the request message;
  if the user is verified and authorised to use the computer program, then a login authorisation message is sent to the computer program, otherwise an authorisation denied message is sent to the computer program;
  whereby upon receipt of the authorisation message the computer program may be used by the user.

Preferably the method includes the steps of:
  the computer program sending a request to the authorisation system to incur a charge for the use of the computer program;
  the authorisation system recording a charge against the identified user for use of the computer program.

Preferably the authorisation system records whether the user is verified, whether the user is authorised to use the computer program and a time stamp.

Preferably the computer program may be a software application or a sub-component of a software application.

Preferably the charge for use of the computer program is recorded in usage units.

Preferably a rate of charging usage units for the use of the computer program is recorded in the authorisation system. A different rate of charge may be applied to different computer programs.

Preferably the usage units are charged by the authorisation system upon receipt of the request to charge for the use of the computer program.

Preferably the request to the authorisation system for charge of usage units is sent once per use of the computer program. Alternatively the request to the authorisation system to charge usage units is sent once per specified period during the use of the computer program.

Preferably the user purchases usage units in advance of use of the computer program, the usage unit total being reduced by each charge, use being authorised only while there are a positive number of usage units left.

Preferably the authorisation message is encrypted. Preferably, the communication between the interface program and the authorisation system is encrypted.

Preferably messages to and from the authorisation system includes a unique component that is only valid for a single use, so that the message can't be duplicated and used again.

Preferably the user identification is obtained from the user by providing the user with a login prompt, the user entering the login identification provided by the authorisation system, the entered user identification being included in the login request.

Preferably an interface program signals the login request to the authorisation system. Preferably the interface program is a separate program called by the computer program being authorised as part of the initialisation of the authorised computer program. In one embodiment the interface program forms part of the computer program and is started when a user attempts to use the computer program. In another alternative embodiment, the interface program is part of an operating system and is started when a user attempts to use the computer program.

Preferably the authorisation system is at a location remote from a computer running the activated computer program. More preferably, the computer running the activated computer program also runs the interface program, the interface program communicates with the authorisation system over a computer network.

Preferably the authorisation system is configured to record and authorise a plurality of computer programs. Typically, the authorisation system is configured to record and authorise a plurality of uses of the same computer program.

In one embodiment the authorisation is provided for each activation of the computer program. Typically, a charge is generated for each use of the computer program. In another embodiment, the authorisation is required periodically, wherein at the end of a period of time specified in the computer program from the last authorisation, a request to charge the usage units is sent to the authorising system for a further authorisation, the authorisation system sends each further authorisation and records the use for each period, whereby a charge is generated for each authorisation message sent.

In yet another embodiment, when the computer program is finished, a terminate message is sent to the authorisation system, the authorisation system records the duration of the use of the computer program between when the authorisation message is sent to the computer program until the terminate message is received, whereby a charge in PUs is generated for use of the computer program corresponding to the recorded duration.

According to another aspect of the present invention there is provided a distributed system for authorising use of a computer program, said system comprising at least:
- an authorisation system, with a storage means for recording an identifier of a computer program to be authorised for use with the authorisation system and recording a user identification;
- a computer for running the computer program;
- the computer being configured to send the identifier of the computer program and user identification to the authorisation system in a login request message when the user makes a request to use the computer program;
- the authorisation system being configured to verify the identity of the user from the recorded user login identification and check that the user is authorised to use the computer program identified by the recorded computer program identifier;
- the authorisation system configured to record the information sent with the request message;
- the authorisation system being configured to send a login authorised message to the computer if the user is verified and authorised to use the computer program and otherwise send an authorisation denied message to the computer;
- whereby the computer is configured to continue use of the computer program upon receipt of the authorisation message but otherwise terminate the use of the computer program.

Preferably the computer is configured to sending a request to the authorisation system to record a charge or the use of the computer program against the identified user for use of the computer program.

Preferably the computer storage means records the rate of charge for the use of the computer program Preferably the authorisation system records a charge against the user upon receipt of the request to charge for use of the computer program.

Preferably the computer is configured to send a request to the authorisation system to charge the user once per use of the computer program.

Preferably the computer is configured to send a request to the authorisation system to charge the user is sent once per specified period during the use of the computer program.

Preferably the computer is the communication between the computer program and the authorisation system is encrypted.

Preferably the computer and authorisation system are configured to include a unique component in the encrypted messages communicated therebetween.

Preferably the authorisation system is at a location remote from a computer running the activated computer program.

Preferably the computer running the activated computer program also runs the interface program, an interface program that communicates with the authorisation system over a computer network.

Preferably the authorisation system is configured to record and authorise a plurality of computer program.

BRIEF DESCRIPTION OF THE DRAWINGS

In order to provide a better understanding, preferred embodiments of the present invention will now be described in detail, by way of example only, with reference to the accompanying drawings, in which.

DETAILED DESCRIPTION OF PREFERRED EMBODIMENTS

Figure 1:
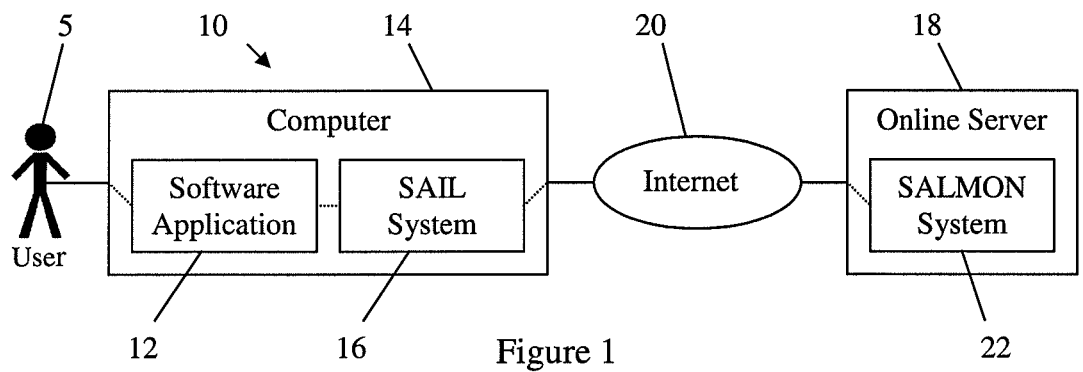
FIG. 1 is a schematic representation of a system that enables the authorisation of use of a computer program in accordance with the present invention.

Referring to FIG. 1, a system 10 is shown for authorising use of a computer program, such as a software application 12 on a computer 14. The computer program may be a sub-component of a larger software application. A user 5 activates the software application 12 for execution on the computer 14. The software application 12 calls an interface program 16, known as a Software Application Interface Library program (SAIL). The SAIL 16 communicates with an on-line server 18 via a network, such as the Internet 20. An authorisation system 22 is running on the server 18. The authorisation system 22 is called a Software Application License Manager Over Networks (SALMON) system. It is noted that the computer platform need not be the same as the server, likewise operating systems of the computer and the server need not be the same. The SALMON system 22 is able to handle many software applications on a plurality of computers, each having a SAIL interfacing with the SALMON system 22 via a communication network, such as the Internet 20. The SALMON system 22 communicates with the SAIL 16 to determine whether the user is authorised to use the software application 12. There is a one to one relationship between the user and the instance of the software application. This allows for each user to be charged for each use of the software application.

The SAIL 16 is provided to a software vendor that wishes to use the system 10 of the present invention. The software vendor incorporates calls to the SAIL 16 in the vendor's computer program.

The computer program or software application 12 is written to be disabled from use until the user 5 is identified to the SALMON system 22 using a login routine of the SAIL 16 and receives an authorisation message from the SALMON system 22. The authorisation message operates as a once off run time license. The SAIL 16 sends another authorisation message to the software application 12 when it receives the authorised message from the SALMON system 22.

Specifically, when the software application is started, it calls a login sub-routine of the SAIL 16. The application waits for the SAIL login sub-routine to return a message indicating that the user is logged in. A software vendor wanting to charge for use of the software can decide the price of use. It may be free, parts of the software may be charged for, or all of the software may be charged for. The cost may be charged on each start-up of the application, on a time basis or on a per function basis. Different users may be charged different rates. A user is charged for using a program use run-time license unit (RTL). The SAIL 16, once logged in, can send a message to the SALMON system 22 to record usage of the computer program/software application according the payment scheme desired.

Figure 3:
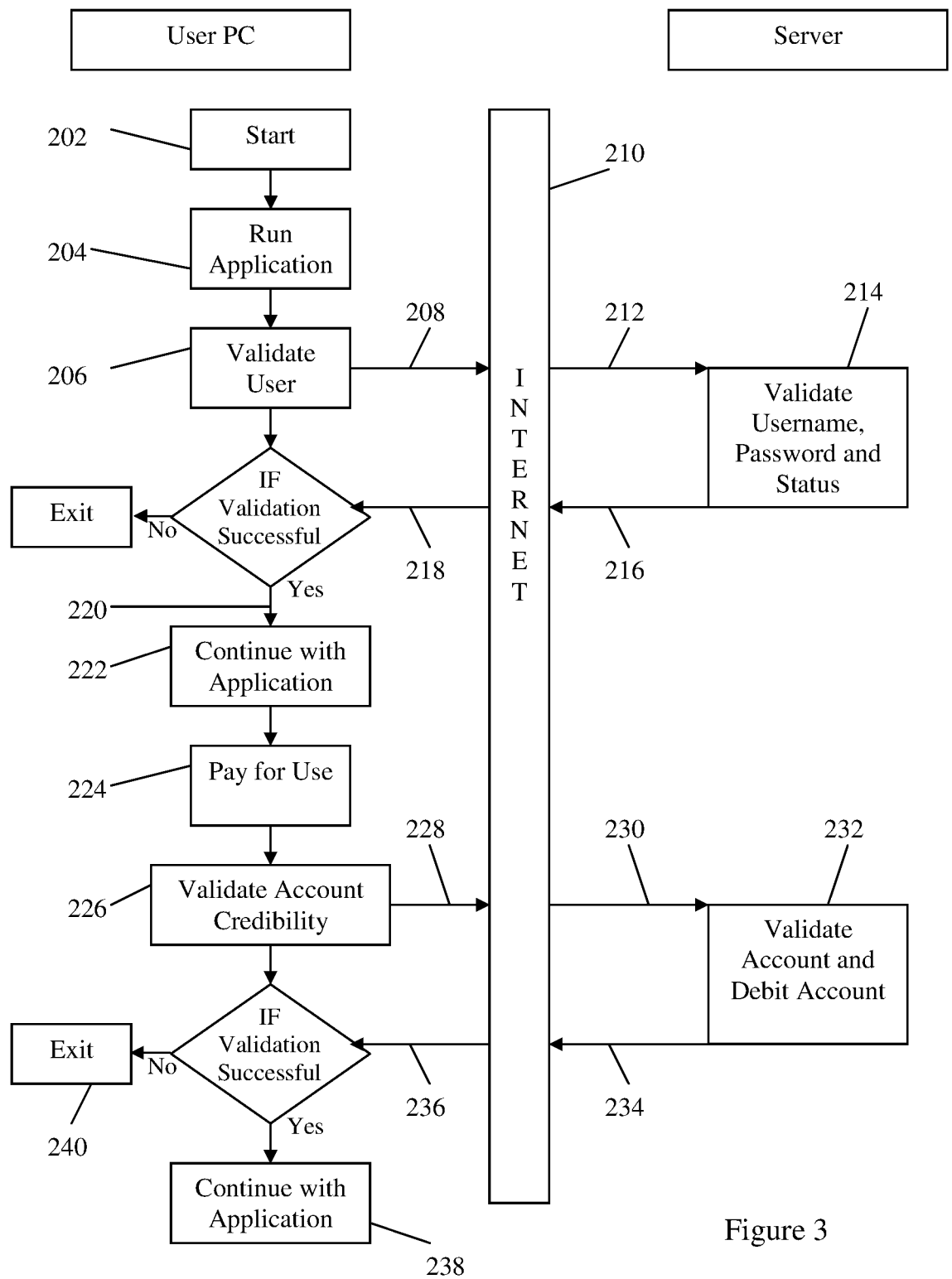
FIG. 3 is a flow chart showing the method of the present invention.

Referring to FIG. 3, which shows the operation of the present invention in the form of a flow chart. The flow chart starts at 202 where a user wishes to run a software application. The user activates the software application in the normal manner at 204. The software application interfaces with the SAIL 16 to validate the user at 206 via a login request message which is encrypted with a public key at 208 by the SAIL 16. The encrypted login request message is communicated over a network 210, such as the internet, and is then decrypted with a private key at 212 in a server running the SALMON system 22. The SALMON system 22 validates the user name, password and the status of the application at 214. If the user is valid and authorised to use the software application, a logged-in confirmation message is encrypted with a public key at 216 and sent across the network 210. It is decrypted at 218 with a private key by the SAIL 16.

If the validation is successful, as indicated by 220, the application continues at 222. If the software vendor wishes the user to pay for the use of the software application, the steps from 224 take place. The account creditability is validated at 226. The SAIL 16 sends a public key encrypted "allocate a charge" message at 228 over the network 210. The message is then decrypted with a private key at 230. The account is checked to determine whether sufficient RTLs are available. If so, the required number of RTLs are debited at 232. A charged confirmation message is encrypted with a public key and sent at 234 across the network 210 and decrypted at 236 with a private key. If the validation is successful the application continues at 238, otherwise it terminates at 240.

The method of encryption of transmitted messages involves the inclusion of a unique component so that a message is valid only once. Each message is in the form of a binary number to be sent between the SAIL 16 and the SALMON system 22. A random number is added to the message. A digestion routine takes the data from the message and the random number to produce a digestion value. The digestion value is computed in such a way that finding an input that will exactly generate a given digest is computationally infeasible. The message data, the random number and the digestion value are then encrypted using a public key. The message is then transmitted. The received message is then decrypted using a private key. The decrypted message is then separated in to individual components. The message can be validated by using the same digestion formula on the message and random number components to check the digestion result calculated against the digestion value received. If the values are the same the message is considered valid, otherwise it is considered invalid. This process provides a different data sequence for each message even if the same acknowledgment message is sent each time. In this way each message includes a unique value which can only be used once. Thus if the message is duplicated it will no longer by valid and will be rejected.

The SALMON system 22 may be configured to allow many users to be authorised at the same time for one or more software application. The software vendor may allow up to a predetermined number of users to login for a particular software application. For each authorised user allowed a login a login resource is allocated in the SALMON system 22. Each available login resource, a login daemon process will be waiting for a user to login.

Figure 2A:
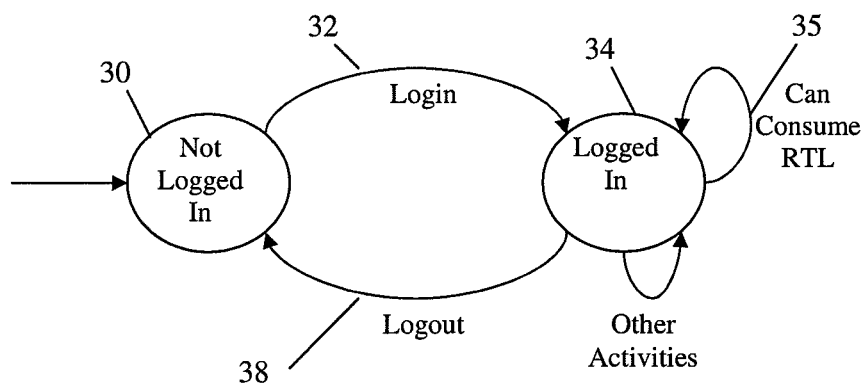
FIG. 2a is a state diagram showing the states of a server waiting for a login.

Referring to FIG. 2a, until a login is received each of the login daemon processes remains in a not logged in state 30. Once a login 32 is received the SALMON system 22 enters a logged in state 34. A routine "Can consume RTL" 35 checks to see whether RTLs may be consumed, until the user 5 logs out at 38, whereupon the login resource of the SALMON system 22 re-enters the not logged in state 30. Thus checking that sufficient funds (in the form of RTLs) are available can be a criterion for authorisation.

Figure 2B:
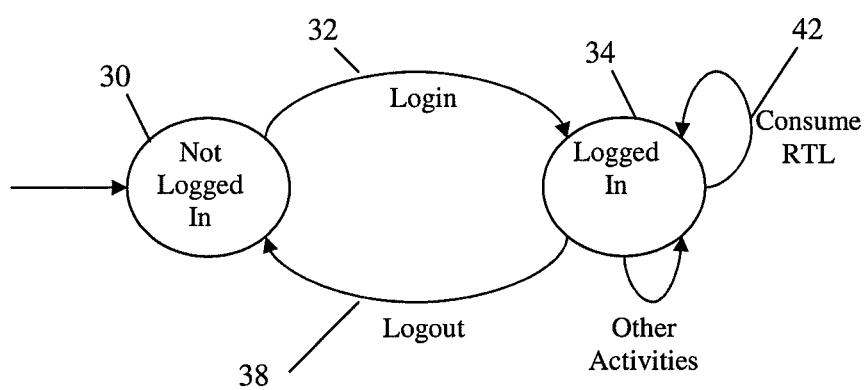
FIG. 2b is a state diagram showing the states of a run time license consumption session.

FIG. 2b shows the consumption of RTLs in the logged in state 34. A routine "ConsumeRTL" 42 consumes RTLs on the successful verification by SALMON system 22. If there are sufficient RTLs and it is a valid transaction. At the completion of the use of software application pending logout, or once all available RTLs are consumed, the user logs out 38.

A user of the software application using the on-line pay as you use model must first be registered with the on-line SALMON system 22. They will be provided with a user name and password so that the SALMON system 22 can identify them and the login details verified.

The login of the user is to verify that the user is logged with the on-line SALMON system 22 before being able to proceed with use of the software. The software application logs out from the SALMON system 22 in order to provide a clean exit. Generally, only one login session per user should be active, a previous session must be logged out before another login session can begin.

Figure 4:
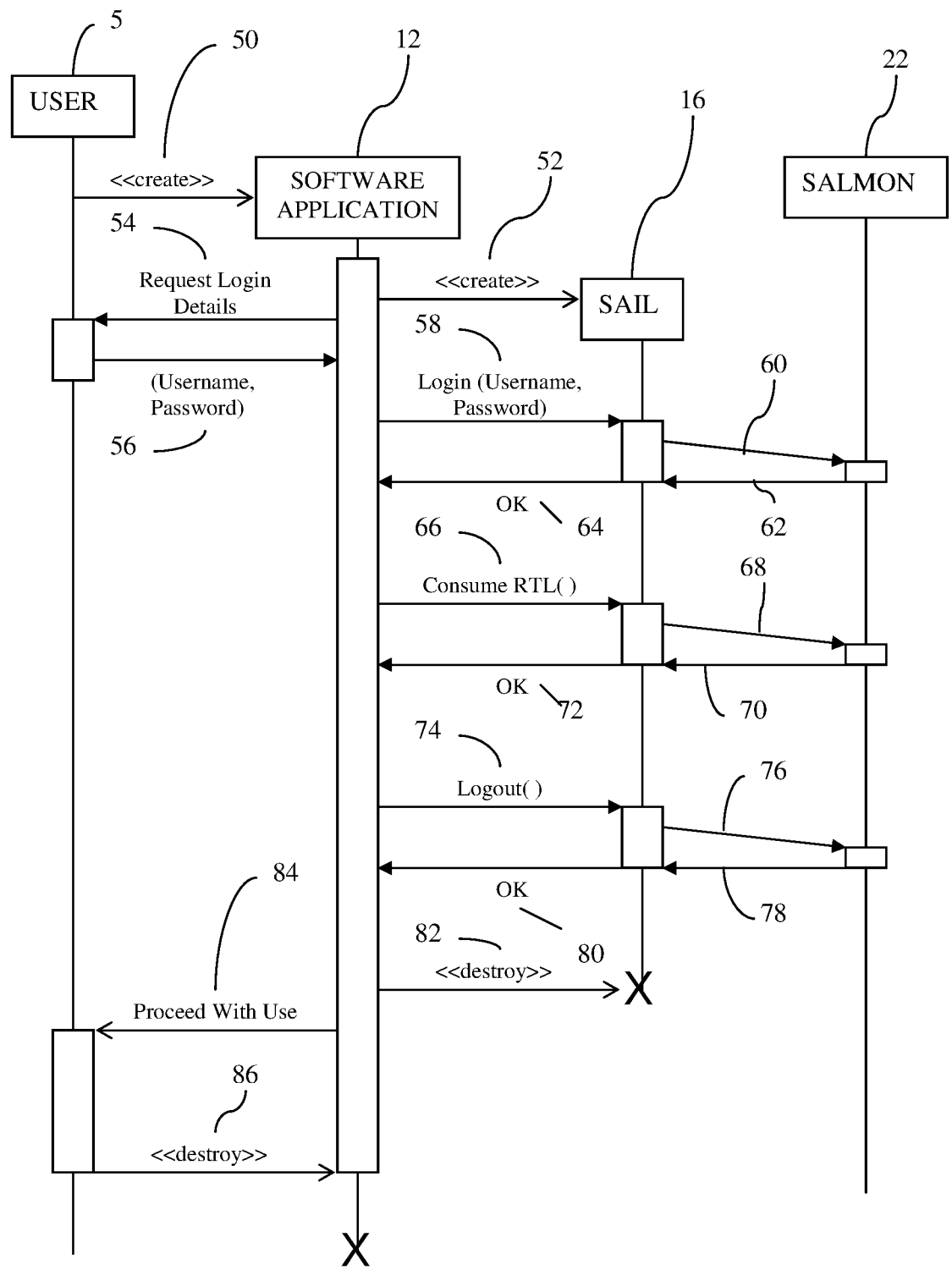
FIG. 4 is a schematic timing diagram of message passing between components of the system of FIG. 1.

Referring to FIG. 4, the passing of messages is now described. A user 5 activates a software application 12 thereby creating 50 an instance of the software application 12. The software application 12 then creates 52 an instance of the SAIL 16. The software application 12 requests details from the user 5 at 54. The user 5 enters a user name and password at 56. The software application calls a "SAIL-login" routine of the SAIL 16 at 58. The SAIL 16 then establishes a connection, via the Internet 20, to the SALMON system 22. The SAIL-login routine then passes the user name, password and an identification of the software to the SALMON system 22. Once confirming that the login details are correct, the SALMON system 22 sends a login "OK" message at 62 to the SAIL 16 which then at 64 sends an "OK" message to the software application 12.

Depending on the model that the software vendor wishes to use the charge for use of the software an appropriate scheme of using RTLs will be used. The scheme described in relation to FIG. 4 is for a one-off charge for use of the software application. Other schemes will be described below.

The software application 12 then sends a one-off request to consume an RTL at 66. This request is a SAIL-consume RTL call. The SAIL-consume RTL sends a consume RTL message to the SALMON system 22 at 68. The SALMON system 22 records the request to consume RTL and sends an authorisation message at 70 to the SAIL 16. The SAIL 16 then passes the OK message at 72 to the software application 12. The software application 12 then begins to log out of the SAIL 16 at 74. The logout message is then passed from the SAIL 16 to the SALMON system 22 at 76. A Logout confirmation message is then passed from the SALMON system 22 to the SAIL 16 at 78. The logout confirmation message is then sent from the SAIL 16 to software application 12 at 80. The software application 12 may then terminate the SAIL program 16 at 82. The user 5 may proceed with use of the software application 12 at 84. Once the user has finished with the software application 12 it may then be terminated at 86.

The recording of the consumption of a one-off consumption of an RTL creates a charge for the one-off use of the software application 12. This charge may be deducted from an amount of RTLs held in credit for the user 5 or may be billed to the user 5.

Different software applications may request the consumption of different numbers of RTLs. For example a word processing application may consume five RTLs whereas a spreadsheet may consume 10. As mentioned above, the software being authorised need only be a sub-component of a large software application. For example, a print function may be regarded as the computer program being authorised. For each use of the print function a charge is accrued. A user 5 may also be entitled to a discount such as, for example, if they are a high volume user. The number of RTLs may then be multiplied by a user discount to produce a final number of RTLs deducted from the user's account.

Figure 5:
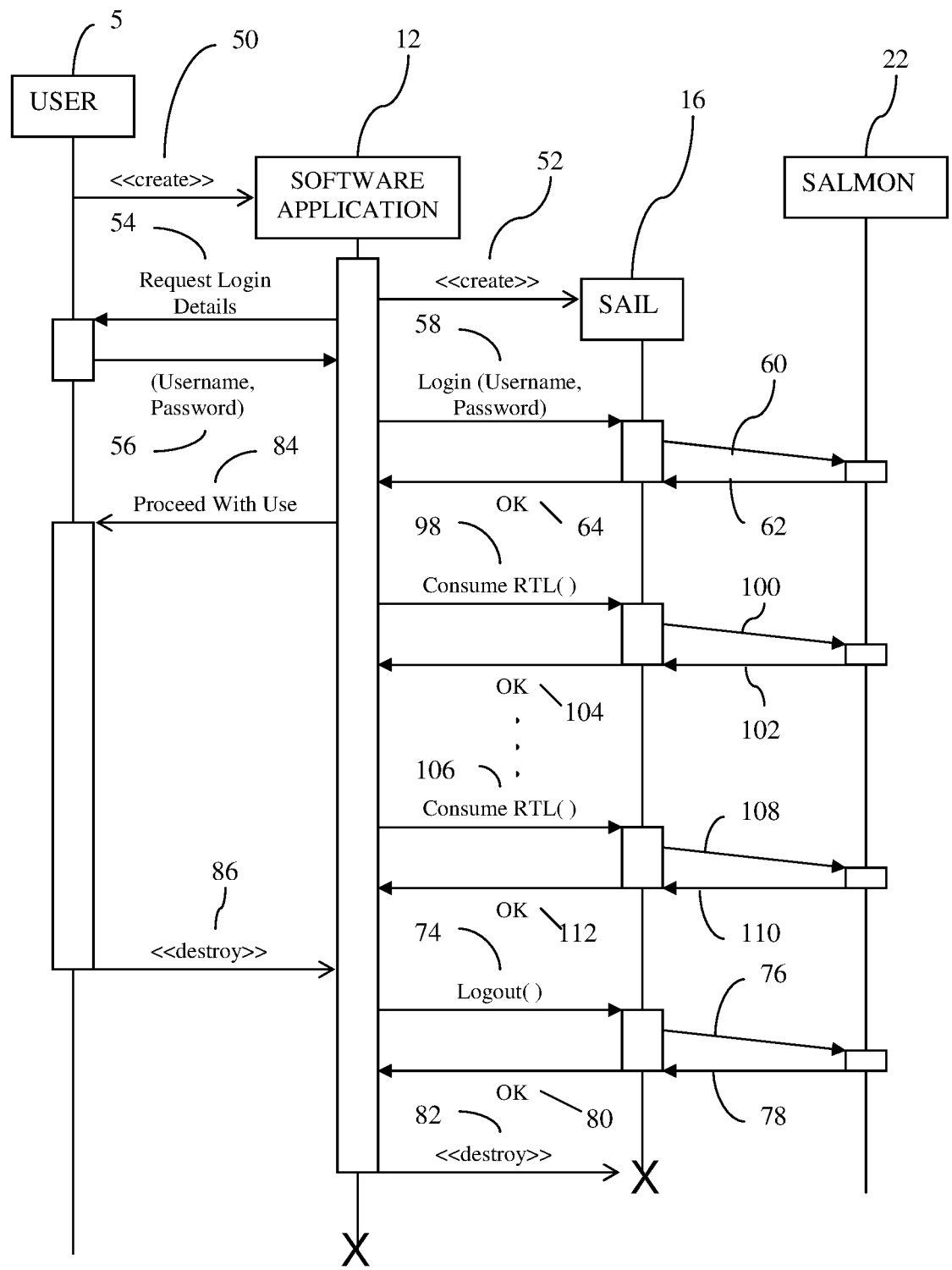
FIG. 5 is a schematic timing diagram of an alternative method of message passing between components of the system of FIG. 1.

Referring to FIG. 5, the periodic consumption of RTLs is described. Periodic consumption of RTLs may be consumed at a different rate to one-off consumption of RTLs. Like numerals depict like actions from FIG. 4. Again the user 5 starts the software application 50 which creates the instance of the SAIL 16 at 52. Login is requested at 54 and login details are provided to the SAIL 16 at 56. The login details are then passed from the software application to SAIL 16 at 58 and then onto the SALMON system 22 at 60. The confirmation of login is passed from the SALMON system 22 to the SAIL 16 at 62, and from the SAIL 16 to the software application at 64. The user may proceed with the normal use of the application at 84. In the meantime, the software application 12 makes periodic requests to the SAIL 16 for the consumption of an RTL at 98. The SAIL 16 passes the request to the SALMON system 22 at 100. The confirmation of the recording of the consumption of the RTL occurs in the SALMON system 22 and the confirmation of this is then passed from the SALMON system 22 to the SAIL 16 at 102 and then from the SAIL 16 to software application 12 at 104.

At the end of each period a further RTL is consumed as indicated by 106, 108, 110 and 112. When the user has finished with the application, a command is sent to exit from the application 12 at 86. The software application then sends the logout message to the SAIL 16 at 74 which is the sent on at 76 to the SALMON system 22. Confirmation of the logout is sent from the SALMON system 22 to the SAIL 16 at 78 and then from the SAIL 16 to the software application 12 at 80, whereupon the software application may end the instance of the SAIL 16 at 82 and then shut itself down.

As an alternative the software application 12 may specify the period to the SAIL 16 and the SAIL 16 handles the operation of sending consume RTL messages to the SALMON system 22 for deduction RTLs from the users account.

The number of periodic RTLs consumed is recorded and a corresponding charge generated. The total charge for the session is deducted from an account or billed out. RTLs may use currency units, the consumption of RTLs is in itself payment. The charge for the consumption of each RTL can be arranged by agreement between the software vendor and the system operator.

Figure 6:
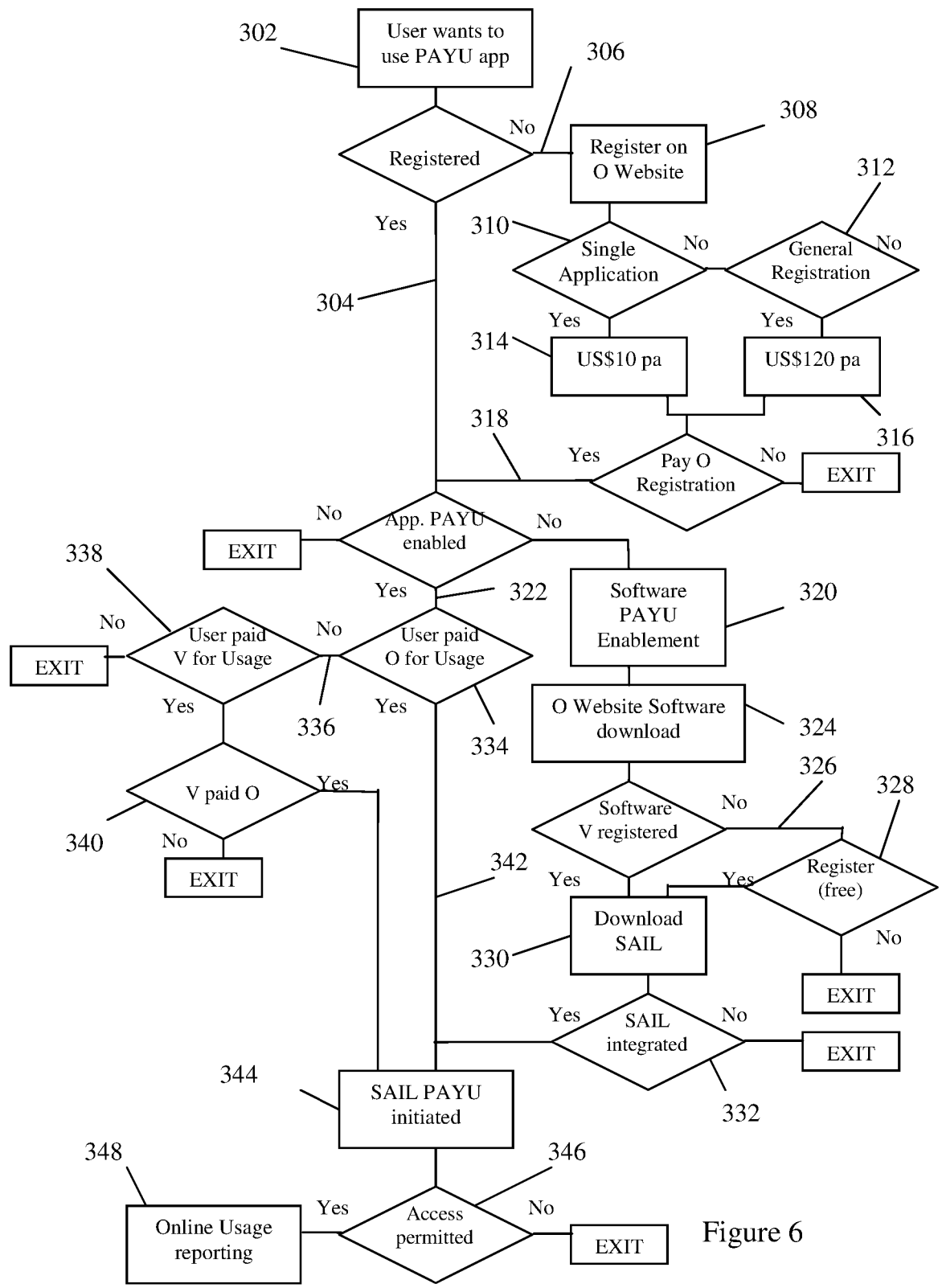
FIG. 6 is a flow chart showing the registration of a user and a software application for use with the present invention.

The SALMON system 22 may be configured to allow many users to be authorised at the same time for one or more software applications. FIG. 6 shows a flow chart setting out the establishment of a pay-as-you-use registration according to the present invention. The flow chart begins at 302 where a user wishes to use a software application utilising the system of the present invention. If the user is registered with the administrators of the authorisation SALMON system 22 they proceed down path 304 otherwise they need to register with the administrator, in this case "OPTIMISER" at 306. An on-line registration site is made available over the Internet at 308, where the user can register to use a single software application 310 or a range of software applications 312. A subscription fee is paid at 314 or 316 depending on whether the user selects a single software application or general use. A rate of, for example US$10 per annum is paid if a single application is to be used. An annual subscription of, for example US$120 per annum is charged for general use of software. Once this payment is made to the administrator the process continues at 318 as if the person was previously registered.

If the user wishes to use an application that is not pay-as-you-use enabled as indicated at 320, the software vendor will need to register the system with the administrators. If the software is registered it will proceed as indicated by 322. The software vendor may download website software as indicated by 324. If the software vendor is not registered with the administrator as indicated by 326 the vendor must register at 328. Once the vendor is registered the SAIL interface program can be downloaded at 330 and integrated into the vendor's software at 332.

Once the user is registered, the user must have credit available with the administrator. This is checked at 334. If they don't, as indicated by 336, they must purchase RTLs. If they have paid the vendor for usage as indicated by 338 the vendor must pass on the usage payment at 340 to the administrator, which will be credited as RTLs. Once the user has RTLs credited as indicated by 342 the user may use the software according to the present invention. When the software application is started the SAIL is activated at 344, as described above, with 344 being equivalent to 50 in FIGS. 4 and 5. The authorisation of the user is indicated by 346 being the equivalent of the OK message 64 in FIGS. 4 and 5. On-line usage reporting, indicated by 348, is equivalent to the recording of the logging in and consumption of RTLs. The user may then view their access usage and RTL consumption at a later stage. Even if the software is not charged for use, the software can be recorded and tracked.

The SAIL interface 16 may provide a "heart beat" function that periodically sends the SALMON system 22 a message to check that a connection between the two still exists. If the connection has dropped out, it may be re-established or the application terminated, depending on the security desired by the software vendor.

A list of SAIL Application Program Interface (API) system calls is listed in appendix 1. A more preferred list of SAIL API system calls is listed in appendix 2. A set of example scenarios showing the use of the SAIL 16 is included in appendix 3.

The SAIL interface as implemented as an Application Programmable Interface (API) library able to interface with the programming language of the software application. Programming methodologies like ActiveX or CORBA can be used to provide class wrappers around the system API library.

Now that the preferred embodiments have been described it will be clear to the skilled addressee that it has at least the following advantages. A locked software application may be provided to each user that is only able to be unlocked and used where the user purchases run time licenses which are consumed on a per use or time basis. This means that software does not need to be downloaded and may be provided on, for example, a floppy disk, CD-ROM or DVD ROM. The user only receives use of the software that they pay for and the user only has to pay for the actual use of the software.

It will be clear that modifications and variations can be made to the present invention, such as the implementation need not be exactly as described in the above mentioned example, the computer language that the underlying software is programmed in may be any suitable language, such as Java, C++ or Visual BASIC. The method of charging and/or billing for use of the run time licenses for the software may vary from those described above. It is also envisages that the present invention may be applicable to authorise specified users to access a program, rather than for payment of RTLs. Such a security measure to only allow certain personnel to access sensitive software applications and is able to track their use.

Such modifications and variations are intended to be within the scope of the present invention, the nature of which is to be determined from the foregoing description.

APPENDIX I

---
SAIL - API system calls
Login
int Login (const char * userName,
         const char * userPassword,
         const int majorVersion,
         const int minorVersion,
         const int revisionversion);
---

Description

Establishes a login and connection to the Optimiser Online Server. It verifies the user and application for a login with the Optimiser Online Server.

This will be the first function call to establish a connection with the Optimiser Online Server.

Parameters

| Name | Description | Input/Output |
|---|---|---|
| UserName | Input, a character string specifying the User Name. The User name has to be | Input |
| UserPassword | Input, a character string specifying the User Password. The User name has to be | Input |
| MajorVersion | The application Major Version number | Input |
| MinorVersion | The application Minor Version number | Input |
| RevisionVersion | The application Revision Version number | Input |

Return Code int Return an error code or SAIL_SUCCESSFUL for a successful Login. Use GetErrorMessage to return a message string from the error code.

The developer should test for the following error codes and perform corrective actions.

| Error Code | Description |
|---|---|
| SAIL WRONGNAMEPASSWORD | The user entered the wrong user name and/or password |
| SAIL WRONGUSERNAME | The user entered the wrong user name |
| SAIL WRONGUSERPASSWORD | The user entered the wrong password |

Remarks:

The application should exit or prevent the user to continue if the return code is not SAIL_SUCCESSFUL Example

C++

```
int errCode;
char userName[ ] = "xxxxx"; 'This has to be registered with
            ' the Optimiser Online Server
char userPassword[ ] = "yyyyy"; 'This has to be registered
            ' with Optimiser Online Server
int majorVersion = 1;
int minorVersion = 2;
int revisionversion = 3;
errCode = Login( userName, userPassword,
        majorVersion, minorVersion, revisionVersion);
if (errCode == 0)
    // Logged In Successful
else
    //logout - Exit Program
```

Visual Basic

```
'Include into the General declarations section or Module file
Option Explicit
Private Declare Function OptimiserLogin Lib "Sail.dll" _
    Alias "Login" _
    (ByVal userName As String, ByVal userPassword As String, _
     ByVal majorVersion As Long, _
     ByVal minorVersion As Long, _
     ByVal revisionVersion As Long _
    ) As Long
'Include into the Form Load section. Dim retVal As Long
Dim userName As String
Dim userPassword As String
    userName = "xxxx"       'This has to be registered with the
            ' Optimiser Online Server
    userPassword = "yyyyy" 'This has to be registered with the
```

-continued

```
' Optimiser Online Server
   retVal = OptimiserLogin(userName, userPassword, 1, 1, 1)
   if (retVal <> SAIL_SUCCESSFUL) Then 'Exit program
   Is LoggedIn
int IsLoggedIn(const int * clpbLoggedIn);
```

Description

Determines whether a login session is currently established.

Parameters

| Name | Description | Input/Output |
|---|---|---|
| ClpbLoggedIn | A flag indicates TRUE when a Loggin is established and FALS if not. | Output |

Return Code int Return an error code or SAIL_SUCCESSFUL for a successful OptimiserIsLoggedIn. Use GetErrorMessage to return a message string from the error code.

Example

C++

```
#define ERR_MESSAGE_LENGTH    255
   int errCode, retVal;
   BOOL *pbLoggedIn = new BOOL;
   errCode = IsLoggedIn(pbLoggedIn); if (errCode !=
   SAIL_SUCCESSFUL)
   {
   retVal = GetErrMessage( errCode,
                 ERR_MESSAGE_LENGTH,
                 errMsg);
      } else {
         if (*pbLoggedIn) {
            // Optimiser Is Logged In.
         } else {
            // Optimiser Is not Logged In.
         }
      }
   }
```

Visual Basic

```
'Include into the General declarations section or Module file Option
Explicit
Private Declare Function OptimiserIsLoggedIn _
Lib "Sail.dll" Alias "IsLoggedIn" (clpbLoggedIn As Long)_As Long
'Include into the Form Load section. Dim clpbLoggedin As Long
   retVal = OptimiserIsLoggedIn(clpbLoggedIn)
   If (clpbLoggedIn      FALSE) Then' Exit program
```

Logout int Logout(void);

Description

This terminates the Internet connection to the Optimiser Online Server.

This function should be called before the application exit or when all Run Time Licence (RTL) consumptions are completed.

Parameters

None

Return Code int Return an error code or SAIL_SUCCESSFUL if the Logout was successful.

Use GetErrorMessage to return a message string from the error code.

Example

C++

```
Int errCode;
errCode = Logout( );
if (errCode == 0)
    printf" "Logout : Successful\n");
```

Visual Basic

```
'Include into the General declarations section or Module file Option
Explicit
Private Declare Function OptimiserLogout _
   Lib "Sail.dll" Alias "Logout" ( ) As Long
'Include into the Form Load section.
iMax = OptimiserLogout( )
```

GetErrMessage int GetErrMessage(int nErrorNum, int iBufferSize, char * const IpszErrorBuf);

Description

This function allows the programmer to retrieve a text string representing the error code.

Parameters

| Name | Description | Input/Output |
|---|---|---|
| nErrorNum | The error number returned by the Optimiser Online Server from a previous function call. | Input |
| IBufferSize | The size allocated for the error message. To retrieve the error message length for memory allocation this argument may be set to NULL. | Input |
| LpszErrorBuf | A pointer to a character string representing the error code. | Output |

Return Code int Return the length of the error message.

Remarks

This function can be used without a Login connection.

Example

C++

```
int errCode;
char errMsg[ERR_MESSAGE_LENGTH];
int msgLength;
retVal = GetErrMessage( errCode,
      ERR_MESSAGE_LENGTH, errMsg); printf(errMsg );
```

Visual Basic

```
'Include into the General declarations section or Module file
Option Explicit
Private Declare Function GetErrorMessage _
      Lib "Sail.dll" Alias "GetErrMessage" _
      (ByVal errNumber As Long, _
      ByVal iBufferSize As Long, _
      errMessage As String) As Long
```

-continued

```
'Include into the Form Load section Dim retVal As Long
Dim iMax As Long
Dim strBuffer As String
'Return the maximum length of the error message
iMax = GetErrorMessage(retVal, 0, ByVal 0&)
' Allocate space for the buffer and clear it
'with Chr$(0) characters
strBuffer = String$(iMax + 1, Chr$(0))
' Call the function again so it can fill strBuffer
iMax = GetErrorMessage(retVal, iMax, ByVal strBuffer)
' Print out the error message
MsgBox "Error Message is : " & strBuffer
```

CanConsumeRTL
int CanConsumeRTL(int * const clpCanConsume);
Description

Determines whether the current login session has sufficient number of RTLs in the user's Optimiser Online Server account to warrant further consumption by the calling software application.

Parameters

| Name | Description | Input/Output |
| --- | --- | --- |
| ClpCanConsume | A return value indicates TRUE if the user may consume some RTL's and FALSE if not. | Output |

Return Code int Return an error code or SAIL_SUCCESSFUL if the CanConsumeRTL was successful. Use GetErrorMessage to return a message string from the error code.

Example

C++

```
int errCode, retVal;
char errMsg[ERR_MESSAGE_LENGTH]; BOOL
*clpCanConsumeRTL = new
BOOL;
errCode = CanConsumeRTL(c1pCanConsumeRTL);
if (errCode!= SAIL_ SUCCESSFUL) {
    retVal = GetErrMessage( errCode,
        ERR_MESSAGE_LENGTH,
        errMsg);
} else {
    if (*clpCanConsumeRTL) {
        // Can Cansume RTLs.
    } else {
        // Can NOT cunsume RTLs.
    }
}
```

Visual Basic

```
'Include into the General declarations section or Module file
Option Explicit
Private Declare Function CanConsumeRTL _
    Lib "Sail.dl1" (clpYesNo As Long) As Long
'Include into the Form Load section. Dim clpYesNo As Long
iMax CanConsumeRTL(clpYesNo)
_if clpYesNo = FALSE) Then ' Exit program
```

ConsumeRTI,
int ConsumeRTL (const int nNumberRTLtoConsume, char * const pszComment);

Description

This operation will debit the currently logged in user's Optimiser Online Server account with the appropriate amount of RTLs based on the name of the calling software application.

Parameters

| Name | Description | Input/Output |
| --- | --- | --- |
| nNumberRTLtoConsume | Specify the amount of RTL's to be deducted from the user's Optimiser Online Server account. | Input |
| pszComment | A character string supplied by the application as a comment to identify usage. This can be any character string | Input |

Return Code int Return an error code or SAIL_SUCCESSFUL if the ConsumeRTL was successful. Use GetErrorMessage to return a message string from the error code.

Remarks:

If return value not SAIL_SUCCESSFUL then further execution should terminated.

Example

C++

```
#define CONSUME_ONE_RTL 1
char szComment [ ] = "Any Comment";
errCode = ConsumeRTL (CONSUME_ONE_RTL , szComment) ;
```

Visual Basic

```
'Include into the General declarations section or Module file Option
Explicit
Private Declare Function ConsumeRTL Lib "Sail.dl1" _
    (ByVal nConsumeAmount As Long, ByVai pszComment As String) As
Long
'Include into the Form Load section.
Dim retVal As Long
retVal = ConsumeRTL (2, "comment")
    LoginConsumeoneLogout
int LoginGonsumeoneLogout( const char * userName,
const char * userPassword,
char * const pszComment,
const int majorVersion,
const int minorVersion,
const int revisionVersion);
```

Description

A single RTL charge is debited from the user's account for the execution lifetime of the software application being used by the user. This function login, connect, consume one RTL and close the connection to the Optimiser Online Server.

Parameters

| Name | Description | Input/Output |
| --- | --- | --- |
| UserName | Input, a character string specifying the User Name. The User name has to be registered with Optimiser Online Server | Input |

| Name | Description | Input/Output |
| --- | --- | --- |
| UserPassword | Input, a character string specifying the User Password. The User name has to be registered with Optimiser Online server | Input |
| PszGomment | A character string supplied by the application as a comment to identify usage. This can be any character string | Input |
| MajorVersion | The application Major Version number | Input |
| MinorVersion | The application Minor Version number | Input |
| Revision Version | The application Revision Version number | Input |

Return Code int Return an error code or SAIL_SUCCESSFUL if the LoginConsumeoneLozout was successful. Use GetErrorMessage to return a message string from the error code.

The developer should test for the following error codes and perform corrective actions.

| Error Code | Description |
| --- | --- |
| SAIL_WRONGNAMEPASSWORD | The user entered the wrong user name and/or password |
| SAIL_WRONGUSERNAME | The user entered the wrong user name |
| SAIL_WRONGUSERPASSWORD | The user entered the wrong password |

Remarks:

The application should exit or prevent the user to continue if the return code is not SAIL_SUCCESSFUL.

Example

C++

```
int errCode;
char userName[ ] "xxxxx";
char userPassword[ ] = "yyyyy";
char pszComment[ ] = "Any Comment";
int majorVersion = 1;
int minorVersion = 2;
int revisionVersion = 3;
errCode = LoginConsumeoneLogout(      userName,
                                      userPassword,
        //Exit program. - Prevent user to continue with
        //application
    else
        // Continue with program
```

Visual Basic

```
'Include into the General declarations section or Module file
Private Declare Function LoginConsumeoneLogout Lib "Sail.d11" _
    ( ByVal userName As String, _
ByVal userPassword As String, _
        ByVal pszComment As String, _
        ByVal majorVersion As Long, _
        ByVal minorVersion As Long, _
        ByVal revisionVersion As Long _
    ) As Long
Option Explicit
Private Declare Function LoginConsumeoneLogout Lib "Sail.dll" _
    ( ByVal userName As String,
ByVal userPassword As String, _
        ByVal pszComment As String, _
        ByVal majorVersion As Long,_
        ByVal minorVersion As Long, _
        ByVal revisionVersion As Long _
    ) As Long
'Include into the Form Load section. Dim retVal As Long
Dim userName As String
Dim userPassword As String
iMax = LoginConsumeoneLogout( userName,
             userPassword,
             "comment", 1, 2, 3)
```

GetDLLVersion int GetDLLVersion(int iBufferSize, char * const clpszVersionString, int * const clpiVersionMajor, int *const clpiVersionMinor, int * const clpiVersionRevision);

Description

Returns the version number of this SAIL to the calling software application. The software application can use this number to keep track and act accordingly of any interface changes to this system if this system is being used in a dynamic environment.

Parameters

| | |
| --- | --- |
| iBufferSize | The clpszVersionString buffer size supplied by the calling Application. |
| clpszVersionString | A character string pointer indicating the version number of the SAIL. |
| majorVersion | SAIL's Major Version number |
| minorVersion | SAIL's Minor Version number |
| revisionVersion | SAIL's Revision Version number |

Return Code int Return the length of the return message clpszVersionString.

Example

C++

```
char *clpszVersionString = new char[225];
int *clpiVersionMajor = new int;
int *clpiVersionMinor = new int;
int *clpiVersionRevision = new int;
int iVersBufferSize = 225;
int msgLenght;
msgLenght = GetDLLVersion( iVersBufferSize,
    clpszVersionString, clpiVersionMajor, clpiVersionMinor,
    clpiVersionRevision);
```

Visual Basic

```
'Include into the General declarations section or Module file
Option Explicit
Private Declare Function GetDLLVersion Lib "Sail.d11" _
    (ByVal bufLength As Long,_
    clpszVersionString As String _
    clpiVersionMajor As Long, _
    clpiVersionMinor As Long, _
    clpiVersionRevision As Long _
    ) As Long
'Include into the Form Load section.
```

GetTimeOutPeriod void GetTimeOutPeriod(int * const milliSeconds);

Description

Returns the maximum number of milliseconds to wait for a reply from the Optimiser Online Server before a timeout condition is to be flagged.

Parameters

| Name | Description | Input/Output |
|---|---|---|
| MilliSeconds | The current set time in milliseconds to wait for a reply from the Online Server before a timeout | Output |

Return Code

None

Example

C++

```
int milliSeconds;
int *piMilliSeconds = new int;
GetTimeOutPeriod(piMilliSeconds);
printf(*piMilliSeconds);
```

Visual Basic

```
'Include into the General declarations section or Module file
Option Explicit
Private Declare Sub GetTimeOutPeriod Lib "Sail.dll" _
    (milliSeconds As Long)
'Include into the Form Load section.
Dim milliSeconds As Long
GetTimeOutPeriod milliSeconds
    SetTimeoutPeriod
    int SetTimeoutPeriod(const unsigned int milliSeconds);
```

Description

Sets the maximum number of milliseconds to wait for a reply from the Optimiser Online Server before a timeout condition is to be flagged.

Parameters

| Name | Description | Input/Output |
|---|---|---|
| milliSeconds | Input by the calling Application. Set the maximum number of milliseconds to wait for a reply from the Optimiser Online Server before a timeout condition is to be flagged. | Input |

Return Code int Return an error code or SAIL_SUCCESSFUL if the SetTimeoutPeriod was successful. Use GetErrorMessage to return a message string from the error code.

Example

C++

```
int errCode;
unsigned int milliSeconds;
milliSeconds = 15000;
errCode = SetTimeoutPeriod(milliSeconds);
if (errCode != SAIL_SUCCESSFUL)
retVal = GetErrMessage(errCode, ERR_MESSAGE_LENGTH, errMsg);
```

Visual Basic

```
'Include into the General declarations section or Module file
Option Explicit
Private Declare Sub SetTimeoutPeriod Lib "Sail.dll" _
    (ByVal milliSeconds As Long)
'Include into the Form Load section.
Dim milliSeconds As Long
milliSeconds = 10000
SetTimeoutPeriod milliSeconds
```

APPENDIX 2

S.A.I.L. Application Programming Interface Definitions

1 SAIL_Login

Prototype

```
SAILRETCODE SAIL_Login
(
    CONST CHAR * CONST szUserName,
    CONST CHAR * CONST szPassword,
    CONST CHAR * CONST szProxyUserName,
    CONST CHAR * CONST szProxyPassword,
    CONST UNSIGNED INT uiMajorVersion,
    CONST UNSIGNED INT uiMinorVersion,
    CONST UNSIGNED INT uiRevisionVersion,
    CONST CHAR * CONST clpcszApplicationID,
    CONST UNSIGNED INT uiConsumeRTLFreguency,
    CONST CHAR * CONST szConsumeRTLFreguencyComment
);
```

Description

This operation establishes a connection to the Optimiser Online Server and attempts to authenticate the user of the software application and the version number of the Software Application.

Two worker threads could also be created with this operation. The first thread periodically consumes a single RTL (see parameter uiConsumeRTLFrequency for details). The other thread maintains a heartbeat to keep the connection alive (see the Remarks section below for details).

Parameters

| Name | Direction | Description |
|---|---|---|
| szUserName | | A pointer to a null-terminated character string specifying the user name of the user of the Software Application. The user must be registered with Optimiser Online Server in order to use the Software Application. This pointer must not be NULL pointer. |
| szPassword | | A pointer to a null-terminated character string specifying the password of the user of the Software Application. This pointer must not be NULL pointer. |
| szProxyUserName | | A pointer to a null-terminated character string specifying the proxy user name required by a proxy server if |

-continued

| Name | Direction | Description |
|---|---|---|
| | | applicable. This proxy username is company specific and the developer should first set this parameter to a NULL pointer and test the return code. If the return code is SAIL_PROXY_AUTH_REQUIRED the developer should prompt the user for their proxy user name which is then used for this parameter in another SAIL Login ( ) operation. |
| szProxyPassword | | A pointer to a null-terminated character string specifying the proxy password required by a proxy server if applicable. This proxy password is company specific and the developer should first set this parameter to a NULL pointer and test the return code. If the return code is SAIL_PROXY_AUTH_REQUIRED the developer should prompt the user for their proxy password which is then used for this parameter in another SAIL_Login( ) operation. |
| uiMajorVersion | | The major version release number of the Software Application. |
| uiMinorVersion | | The minor version release number of the Software Application. |
| uiRevisionVersion | | The revision version release number of the Software Application. |
| szApplicationID | | A pointer to a null-terminated character string specifying an Application Identifier supplied by Optimiser. This pointer must not be NULL pointer. |
| uiConsumeRTLFrequency | | This parameter defines the period in minutes for automated consumption of a single RTL. This automated consumption is implemented in a worker thread. The thread starts when the user has successfully logged into the Optimiser Online Server whereby it enters a loop of consuming a single RTL and then sleeping for the specified period. If consuming a RTL fails, the thread will issue a call to exit (−1) and terminate the calling Software Application. The thread will not be created if the value is set to zero. |
| szConsumeRTLFrequencyComment | | A pointer to a null-terminated string containing a comment about the RTL transaction being performed by the automated consumption of RTLs. |

Return Value

Returns an error code or SAIL_SUCCESSFUL if the operation was successful. Use SAIL_GetErrorMessage( ) to return a textual representation of the error code. The developer should test for the following return values and perform the appropriate action:

| Error Code | Description | Action |
|---|---|---|
| SAIL_SUCCESS | The operation was successful. | The user has been authorised to continue to use the Software Application. The Software Application may now proceed with further execution. |
| SAIL_PROXY_AUTH_REQUIRED | The user is required to enter their proxy user name and proxy password details so that SAIL may instruct the proxy to establish a connection to the Optimiser Online Server. | The developer should prompt the user for their proxy username and proxy password. Another SAIL_Login( ) should be called with the parameters szProxyUserName and szProxyPassword set to the data entered by the user. |
| SAIL_WRONGNAMEPASSWORD | The user entered the wrong user name and/or password. | The user should re-enter the authentication details. |
| SAIL_APPACCESS DENIED | The user does not have access to this application | The application should exit |
| SAIL_INSUFFICIENT_RTLs_LEFT | There are insufficient RTLs in the user's account to allow the Software Application to continue running. | The Software Application should report the error to the user and then exit cleanly. |

The Software Developer should consider any other errors returned by this operation as serious failures. The Software Application should report the error to the user and then exit cleanly.

Remarks

The Software Application should not proceed further in its execution until one of the following conditions has been satisfied:

The Optimiser Online Server via the SAIL system has verified a valid username and password pair.

The user wishes to cancel the entering of authentication details into the Software Application to be used by SAIL for verification, in which case the Software Application should then exit cleanly.

Once a successful connection to the Optimiser Online Server has been established and the user authorised, then this operation will create up to two worker threads. One thread maintains a heartbeat to keep alive a connection to the server and the other to periodically consumes RTLs from the logged in user's account.

The frequency of the heartbeat can be set with the operation SAIL_SetHeartBeatFrequency( ). The operation SAIL_GetHeartBeatFrequency( ) can be used to determine the current heartbeat frequency. If this frequency is set to zero, then the worker thread that performs the heartbeat will not be created.

The period of the RTL consumption is set through the uiConsumeRTLFrequency parameter. At every period, a single RTL is consumed and the transaction is recorded with the comment specified in the szConsumeRTLFrequencyComment parameter.

Examples

C++ Pseudo Code

```
#include "SAIL.h" SAILRETCODE RetCode;
// NOTE: The following user name and password should be replaced
//              with a registered user name and password supplied from
//              Optimiser and should never be hardcoded. The user must
//              be provided with a mechanism for entering these details.
CHAR sername[ ] = "xxxxx'; CHAR userPassword[ ] = "yyyyy";
// NOTE: The following proxy user name and proxy password should
//              be replaced with the proxy user name and proxy password
//              supplied by the related company administrator and should
//              never be hardcoded. The user must be provided with a
//              mechanism for entering these details.
CHAR userProxyName [ ]   "aaaa";
CHAR userProxyPassword[ ] = "bbbbbb";
// NOTE: The following indicates the version release of this
//              Application.
UINT majorVersion = 1;
UINT minorVersion = 2;
UINT revisionversion = 3;
// NOTE: The following Application ID is an unique identifier
//   provided by Optimiser.
CHAR applicationID[ ] = "zzzzzz";
RetCode = SAIL_Login(
            userName,
            userPassword,
            NULL,
            NULL,
            majorVersion,
            minorVersion,
            revisionversion,
            applicationlD,
            0,              //Don't start the thread
                            //consumes RTLs periodically
            NULL);
while (RetCode == SAIL_PROXY_AUTH_REQUIRED) (
    // The SAIL connects to a proxy server which requires a
    // proxy user name and proxy password.
    //
    // NOTE: Prompt user for proxy user name and proxy password
    //   here and assign their entered proxy details to the
    //   variables userProxyName and userProxyPassword
    //   respectively!!!
    RetCode = SAIL_Login(
            userName,
            userPassword, userProxyName, userProxyPassword,
            majorVersion, minorVersion, revisionVersion, applicationlD,
            0,              //Don't start the thread that
            //consumes RTLs periodically
            NULL);
}
if (RetCode == SAIL SUCCESSFUL) {
    // The user has now logged into the Optimiser Online Server
    // and may now proceed with using the application.
    }else {
    // The login was not successful - handle error condition here.
}
```

Visual Basic Pseudo Code

```
Option Explicit
   Private Declare Function SAIL_Login _
       Lib "SAIL.dll" _
           (ByVal szUserName As String, _
           ByVal szPassword As String, _
           ByVal szProxyUserName As String, _
           ByVal szProxyPassword As String,_
           ByVal uiMajorVersion As Long, _
           ByVal uiMinorVersion As Long, _
           ByVal uiRevisionVersion As Long,
           ByVal szApplicationID As String, _
           ByVal consumeRTLFrequency As Long, _
           ByVal consumeRTLFrequencyComment As String) As Long
   Dim RetCode As Long
   Dim strUserName As String
   Dim strPassword As String
   Dim strProxyUserName As String
   Dim strProxyPassword As String
   Dim strApplicationID As String
   Dim ConsumeRTLFrequency As Long
   Dim strConsumeRTLFrequencyComment As String
   ' NOTE: The following user name and password should be replaced with
   '   a registered user name and password supplied from Optimiser and
   '   should never be hardcoded. The user must be provided with a
   '   mechanism for entering these details.
   strUserName = "xxxxx"
   strPassword = "yyyyy"
   ' NOTE: The following proxy user name and proxy password should be
   '   replaced with the proxy user name and proxy password supplied
   '   by the related company administrator and should never be
   '   hardcoded. The user must be provided with a mechanism for
   '   entering these details.
   strProxyUserName = "aaaa"; strProxyPassword = "bbbbbb";
   ' NOTE: The following Application ID is an unique identifier
   '   provided by Optimiser
   strApplicationID = "zzzzzzz"
   RetCode SAIL_Login(
           strUserName,
           strPassword,
           ByVal 0&,
           ByVal 0&,
           App.Major,
           App.Minor,
           App.Revision, strApplicationID, 0, ' Don't start the thread that
                                                      ' consumes RTLs periodically
           ByVal 0&)
   While ( RetCode = SAIL_PROXY_AUTH_REQUIRED )
       ' The SAIL connects to a proxy server which requires a
       ' proxy user name and proxy password.
       ' NOTE: Prompt user for proxy user name and proxy password
       '                       here and assign their entered proxy details to
       '                       the variables userProxyName and userProxyPassword
       ' respectively!!!
       RetCode = SAIL_Login(
               strUserName,
               strPassword,
               strProxyUserName,
               strProxyPassword,
               App.Major,
               App.Minor,
               App.Revision,
               strApplicationID,
               0,                                    ' Don't start the thread that
                                                     ' consumes RTLs periodically
           ByVal 0&)
   Wend
   If (RetCode = SAIL_SUCCESSFUL) Then
       ' The user has now logged into the Optimiser Online Server and
       ' may now proceed with using the application.
   Else
       ' The login was not successful - handle error condition here.
   End If
```

2 SAIL_IsLoggedIn
Prototype

```
SAILRETCODE SAIL_IsLoggedIn
(
    BOOL * CONST clpbLoggedIn
);
```

Description
Determines whether a login session is currently established.
Parameters

| Name | Direction | Description |
|---|---|---|
| clpbLoggedIn | In | A pointer to a boolean flag. The contents of the flag will be modified by the operation to indicate whether a current login session is currently established. This pointer must not be a NULL pointer. |

Return Value
Returns an error code or SUCCESSFULSAIL_if the operation was successful. Use SAIL_GetErrorMessage ( ) to return a textual representation of the error code.
Remarks
None Examples C++ Pseudo Code

```
SAILRETCODE RetCode;
BOOL bLoggedIn;
RetCode = SAIL_IsLoggedIn(SbLoggedIn);
if (RetCode == SAIL_SUCCESSFUL) {
    if (bLoggedIn) (
        // The user is logged in to the Optimiser Online Server.
    } else {
        // The user is not logged in to the Optimiser Online Server
    }
} else {
    // Handle error condition here.
}
```

Visual Basic Pseudo Code

```
Option Explicit
Private Declare Function SAIL_IsLoggedIn _
    Lib "SAIL.dll" (clpbLoggedIn As Long) As Long
Dim RetCode As Long
Dim blnLoggedIn As Long
RetCode = SAIL_IsLoggedIn(blnLoggedIn) If (RetCode = SAIL_ SUCCESSFUL)
Then
    If (CBool(blnLoggedIn) = True) Then
        ' The user is logged in to the Optimiser Online Server. Else
        ' The user is not logged in to the Optimiser Online Server.
    End If Else
    ' Handle error condition here.
End If
```

3 SAIL_Logout
Prototype
SAILRETCODE SAIL_Logout ( );
Description
This logs the user out from the Optimiser Online Server. The invocation of this operation should be called to exit cleanly from the Optimiser Online Server and free any resources SAIL has been allocated with by the underlying operating system.
Parameters
None
Return Value
Returns an error code or SAIL_SUCCESSFUL if the operation was successful. Use SAIL_GetErrorMessage( ) to return a textual representation of the error code.
The developer should test for the following return values and perform the appropriate action:

| Error Code | Description | Action |
|---|---|---|
| SAIL_SUCCESS | The operation was successful. | The Software Application may now proceed with further execution. |
| SAIL_NOTLOGGEDIN | The user was not logged in for this operation to be successful. | No action required. |

The Software Developer should consider any other errors returned by this operation as serious failures. The Software Application should report the error to the user and then exit cleanly.
Remarks
None Examples C++ Pseudo Code

```
SAILRETCODE errCode;
RetCode = SAIL_Logout( );
if (RetCode == SAIL SUCCESSFUL) {
    // The logout from the Optimiser Online Server was successful.
} else {
    // The logout from the Optimiser Online Server was not
    // successful - handle error condition here.
}
```

Visual Basic Pseudo Code

```
Option Explicit
Private Declare Function SAIL_Logout _ Lib "SAIL.dll" ( ) As Long
Dim RetCode As Long
RetCode = SAIL_Logout ( )
If (RetCode = SAIL_SUCCESSFUL) Then
    ' The logout from the Optimiser Online Server was successful.
Else
    ' The logout from the Optimiser Online Server was not
    ' successful - handle error condition here.
End If
```

4 SAIL_GetErrorMessage
Prototype

```
UNSIGNED INT SAIL_GetErrorMessage
(
    CONST SAILRETCODE ErrorNum,
    CONST UNSIGNED INT uiBufferSize,
    CHAR * CONST clpszMessageBuffer
);
```

Description
This operation allows the software developer to retrieve a textual representation of the specified error number.

Parameters

| Name | Direction | Description |
| --- | --- | --- |
| ErrorNum | In | The error number as returned from a SAIL operation. |
| uiBufferSize | In | The size of the message buffer to contain the corresponding textual representation of the specified SAIL error number. |
| clpszMessageBuffer | In | A pointer to a buffer to contain a null-terminated string describing the specified SAIL error number. The pointer can be a NULL pointer. |

Return Value

Returns the maximum size required to be able to store the corresponding textual representation of the specified SAIL error in its entirety.

Remarks

None

Examples

C++ Pseudo Code

```
SAILRETCODE RetCode;
CHAR * szMsg;
INT iMsgLength;
szMsg = NULL;
iMsgLength = 0;
// Retrieve the maximum length of the error message.
iMsgLength = SAIL_GetErrorMessage (
    RetCode,
    iMsgLength,
    szMsg) ;
// Allocate enough space for the error message and a
// terminating null character.
szMsg = new CHAR[iMsgLength + 1];
// Retrieve the error message.
iMsgLength = SAIL_GetErrorMessage(
    RetCode,
    iMsgLength,
    szMsg);
// Display the error message to the user.
cout << "The SAIL Error Message is: " << szMsg << endl;
// Free resource.
delete [ ] szMsg;
szMsg = NULL;
```

Visual Basic Pseudo Code

```
Option Explicit
Private Declare Function SAIL_GetErrorMessage _ Lib "SAIL.dll"
    (ByVal ErrorNum As Long, _
        ByVal iBufferSize As Long, _
        MessageBuffer As String) As Long
Dim RetCode As Long
Dim lngMax As Long
Dim strBuffer As String
' Return the maximum length of the error message.
lngMax = SAIL_GetErrorMessage(RetCode, 0, ByVal 0&)
' Allocate space for the error message and space for a
' terminating null character. Clear the space with Chr$(0)
' characters.
strBuffer = String$(lngMax + 1, Chr$(0))
' Call the function again so it can fill strBuffer with the
' error message.
lngMax =SAIL_GetErrorMessage(RetCode, lngMax, ByVal strBuffer)
' Print out the obtained error message.
MsgBox "The SAIL Error Message is: " & strBuffer
```

5 SAIL_CanConsumeRTL

Prototype

```
SAILRETCODE SAIL_CanConsumeRTL
(
    BOOL * CONST clpbCanConsume
) ;
```

Description

Determines whether the current login session has sufficient number of RTLs in the user's Optimiser Online Server account to warrant further consumption by the calling Software Application.

Parameters

| Name | Direction: | Description |
| --- | --- | --- |
| clpbCanConsume | In | A pointer to a boolean flag. The contents of the flag will be modified by the operation to indicate whether there are sufficient RTLs in the user's account to consume. This pointer must not be a NULL pointer. |

Return Value

Returns an error code or SAIL_SUCCESSFUL if the operation was successful. Use SAIL_GetErrorMessage( ) to return a textual representation of the error code.

The Software Developer should consider any errors returned by this operation, other than SAIL_SUCCESSFUL, as serious failures. The Software Application should report the error to the user and then exit cleanly.

Remarks

None

Examples

C++ Pseudo Code

```
SAILRETCODE RetCode;
BOOL bCanConsumeRTL;
RetCode = SAIL_CanConsumeRTL(&bCanConsumeRTL);
if (RetCode == SAIL_SUCCESSFUL) {
    if (bCanConsumeRTL) {
        // The user is allowed to consume more RTLs. } else {
        // The user can not consume more RTLs.
        }
} else {
    // Handle error condition here.
}
```

Visual Basic Pseudo Code

```
Option Explicit
Private Declare Function SAIL_CanConsumeRTL _
    Lib "SAIL.dll" (clpbYesNo As Long) As Long
Dim RetCode As Long
Dim blnYesNo As Long
RetCode = SAIL_CanConsumeRTL(blnYesNo)
If (RetCode = SAIL_SUCCESSFUL) Then
    If (CBool(blnYesNo) = True) Then
        ' The user is allowed to consume more RTLs.
    Else
        ' The user can not consume more RTLs.
    End If
Else
    ' Handle error condition here.
End If
```

6 SAIL_ConsumeRTL

Prototype

```
SAILRETCODE SAIL_ConsumeRTL
    CONST UNSIGNED INT uiNumberRTLtoConsume, CONST
    CHAR * CONST
        szComment
);
```

Description

This operation will debit the currently logged in user's Optimiser Online Server account with the appropriate amount of RTLs based on the name of the calling software application.

Parameters

| Name | Direction | Description |
| --- | --- | --- |
| uiNumberRTLtoConsume | In | Specify the amount of RTLs to be deducted from the user's Optimiser Online Server account. This has an upper limit of 1000. |
| szComment | In | A pointer to a null-terminated string containing a comment about the RTL transaction being performed by this operation. This pointer must not be the NULL pointer. |

Return Value

Returns an error code or SAIL_SUCCESSFUL if the operation was successful. Use SAIL_GetErrorMessage ( ) to return a textual representation of the error code.

The developer should test for the following return values and perform the appropriate action:

| Error Code | Description | Action |
| --- | --- | --- |
| SAIL_SUCCESS | The operation was successful. | The Software Application may now proceed with further execution. |
| SAIL_INSUFFICIENT_RTLs_LEFT | There are insufficient RTLs in the user's account to allow the Software Application to continue running. | The Software Application should report the error to the user and then exit cleanly. |

The Software Developer should consider any other errors returned by this operation as serious failures. The Software Application should report the error to the user and then exit cleanly.

Remarks

The szComment parameter should contain a brief comment about the RTL transaction being performed. The size of the network packets generated by this operation to the Optimiser Online Server is dependent upon the length of this parameter. These network packets should be kept to a minimum size and it is the responsibility of the Software Developer to adopt and maintain this philosophy when invoking this operation.

For this operation to complete successfully, the Software Application should be registered with Optimiser Online. The user should also have sufficient RTLs in their Optimiser Online account. Registration and crediting a user's account is beyond the scope of this document. Please contact Optimiser for further information regarding these matters

Examples

C++ Pseudo Code

```
#define CONSUME_ONE_RTL 1
char szComment[ ]          "Some Comment";
SAILRETCODE RetCode;
RetCode = SAIL_ConsumeRTL(CONSUME_ONE_RTL,
                          szComment);
switch (RetCode) {
    case SAIL_SUCCESSFUL:
        // The operation was successful
        break;
    case SAIL_INSUFFICIENT_RTLs_LEFT
        // The operation was not successful - handle
        // condition here.
        break;
    default:
        // The operation was not successful - handle
        // error condition here.
}
```

Visual Basic Pseudo Code

```
Option Explicit
Private Declare Function SAIL_ConsumeRTL _
    Lib "SAIL.dll" (ByVal uiConsumeAmount As Long,
        ByVal szComment As String) As Long
Dim RetCode As Long
RetCode = SAIL_ConsumeRTL (2, "I've consumed two RTLs here")
Select Case RetCode
    Case SAIL_SUCCESSFUL
        ' The operation was successful.
    Case SAIL_INSUFFICIENT_RTLs_LEFT
        ' The operation was not successful - handle
        ' condition here.
    Case Else
        ' The operation was not successful - handle
        ' error condition here.
End Select
```

7 SAIL_LoginConsumeoneLogout

Prototype

```
SAILRETCODE SAIL_LoginConsumeoneLogout
(
    CONST CHAR * CONST szUserName,
    CONST CHAR * CONST szPassword,
    CONST CHAR * CONST szProxyUserName,
    CONST CHAR * CONST szProxyPassword,
    CONST CHAR * CONST szComment,
    CONST UNSIGNED INT uiMajorVersion,
    CONST UNSIGNED TNT uiMinorVersion,
    CONST UNSIGNED INT uiRevisionVersion,
    CONST CHAR * CONST clpcszApplicationID, CONST
    UNSIGNED
    INT uiConsumeRTLFrequency
);
```

Description

A single RTL charge is debited from the user's account for the execution lifetime of the software application being used by the user. This operation attempts the following SAIL operations in order:

```
SAIL_Login(
    szUserName,
    szPassword,
```

```
        szProxyUserName, szProxyPassword, uiMajorVersion,
        uiMinorVersion, uiRevisionVersion, szApplicationID,
        uiConsumeRTLFrequency, szComment);
    SAIL_ConsumeRTL (1, szComment ) ; SAIL_Logout ( ) ;
```

If either of the above operations fails then this operation fails overall.

In addition, a worker thread could also be created with this operation. The worker thread periodically consumes a single RTL (see parameter uiConsumeRTLFrequency for details).

Parameters

| Name | Direction | Description |
|---|---|---|
| szUserName | In | A pointer to a null-terminated character string specifying the user name of the user of the Software Application. The user must be registered with Optimiser Online Server in order to use the Software Application. This pointer must not be NULL pointer. |
| szPassword | In | A pointer to a null-terminated character string specifying the password of the user of the Software Application. This pointer must not be NULL pointer. |
| szProxyUserName | In | A pointer to a null-terminated character string specifying the proxy user name required by a proxy server if applicable. This proxy username iscompany specific and the developer should first set this parameter to a NULL pointer and test the return code. If the return code is SAIL_PROXY_AUTH_REQUIRED the developer should prompt the user for their proxy user name which is then used for this parameter in another SAIL_Login( ) operation. |
| sz ProxyPassword | | A pointer to a null-terminated character string specifying the proxy password required by a proxy server if applicable. This proxy password is company specific and the developershould first set this parameter to a NULL pointer and test the return code. If the return code is SAIL_PROXY_AUTH_REQUIRED the developer should prompt the user for their proxy password which is then used for this parameter in another SAIL_Login( ) operation. |
| szComment | | A pointer to a null-terminated string containing a comment about the RTL transaction being performed by this operation. |
| uiMajorVersion | | The major version release number of the Software Application. |
| uiMinorVersion | | The minor version release number of the Software Application. |
| uiRevisionVersion | | The revision version release number of the Software Application. |
| szApplicationID | | A pointer to a null-terminated character string specifying an Application Identifier supplied by Optimiser. This pointer must not be NULL pointer. |
| uiConsumeRTLFrequency | | This parameter defines the period in minutes for automated consumption of a single RTL. This automated consumption is implemented in a worker thread. The thread starts when the user has successfully logged into the Optimiser Online Server whereby it enters a loop of consuming a single RTL and then sleeping for the specified period. If consuming a RTL fails, the thread will issue a call to exit ( −1) and terminate the calling Software Application. The thread will not be created if the value is set to zero. If this value is set the function should be called only once during the lifetime of the Software Application. |

Return Value

Returns an error code or SAIL_SUCCESSFUL if the operation was successful. Use SAIL_GetErrorMessage( ) to return a textual representation of the error code.

The developer should test for the following return values and perform the appropriate action:

| Error Code | Description | Action |
|---|---|---|
| SAIL_SUCCESS | The operation was successful. | The Software Application may now proceed with further execution. |
| SAIL_PROXY_AUTH_REQUIRED | The user is required to enter their proxy user name and proxy password details so that SAIL may instruct the proxy to establish a connection to the Optimiser Online Server. | The developer should prompt the user for their proxy username and proxy password. Another SAIL_Login ( ) should be called with the parmmeters szProxyUserName and sz ProxyPassword set to the data entered by the user. |
| SAIL_WRONGNAMEPASSWORD | The user entered the wrong user name and/or password. | The user should re-enter the authentication details. |
| SAIL_SERVERDENIESREQUEST | The Optimiser Online Server denied the request for consuming more RTLs the user's account. Possible causes could be: There are insufficient RTLs in the user's Optimiser Online account to consume the | The Software Application should report the error to the user and then from exit cleanly. |

-continued

| Error Code | Description | Action |
| --- | --- | --- |
| | required amount The Software Application is not registered with Optimiser Online. | |
| SAIL_APPACCESSDENIED | The user does not have access to this application | The application should exit. |
| SAIL_INSUFFICIENT_RTLs_LEFT | There are insufficient RTLs in the user's account to allow the Software Application to continue running | The Software Application should report the error to the user and then exit cleanly. |

The Software Developer should consider any other errors returned by this operation as serious failures. The Software Application should report the error to the user and then exit cleanly.

Remarks

The szComment parameter should contain a brief comment about the RTL transaction being performed. The size of the network packets generated by this operation to the Optimiser Online Server is dependent upon the length of this parameter. These network packets should be kept to a minimum size and it is the responsibility of the Software Developer to adopt and maintain this philosophy when invoking this operation.

The Software Application should not proceed further in its execution until one of the following conditions has been satisfied:

The Optimiser Online Server via the SAIL system has verified a valid username and password pair.

The user wishes to cancel the entering of authentication details into the Software Application to be used by SAIL for verification, in which case the Software Application should then exit cleanly.

This operation can create a worker thread. The working thread periodically consumes RTLs from the logged in user's account.

The period of the RTL consumption is set through the uicConsumeRTLFrequency parameter. At every period, a single RTL is consumed and the transaction is recorded with the comment specified in the szConsumeRTLFrequencyComment parameter.

Examples

C++ Pseudo Code

```
#include "SAIL.h"
// NOTE: The following user name and password should be replaced
//                    with a registered user name and password supplied from
//                    Optimiser and should never be hardcoded. The user must
//                    be provided with a mechanism for entering these details.
CHAR szUserName[ ]                         "xxxxx";
CHAR szPassword[ ]                         "yyyyy";
// NOTE: The following proxy user name and proxy password should
//                    be replaced with the proxy user name and proxy password
//                    supplied by the related company administrator and should
//                    never be hardcoded. The user must be provided with a
//                    mechanism for entering these details.
CHAR szProxyUserName[ ] = "aaaa"; CHAR szProxyPassword[ ] = "bbbbbb";
SAILRETCODE RetCode;
CHAR szComment[ ] = "Any Comment";
UINT uiMajorVersion = 1;
UINT uiMinorVersion = 2;
UINT uiRevisionVersion = 3;
// NOTE: The following Application ID is an unique identifier
//                    which is provide by Optimiser
CHAR szApplicationID = "zzzzzzz"
// NOTE: The following is used to indicate that SAIL should
//                    automatically consume an RTL every 12 hours from login.
UINT uiConsumeRTLFrequency = 12 * 60;
RetCode = SAIL__LoginConsumeoneLogout(
                                        szUserName,
                                        szPassword,
                                        NULL,
                                        NULL,
                                        szComment,
                                        uiMajorVersion,
                                        uiMinorVersion,
                                        uiRevisionVersion,
                                        szApplicationID,
                                        uiConsumeRTLFrequency);
        while (RetCode == SAIL PROXY AUTH REQUIRED) {
                // The SAIL connects to a proxy server which requires a
                // proxy user name and proxy password.
                //
```

-continued

```
            // NOTE: Prompt user for proxy user name and proxy password
            //                 here and assign their entered proxy details to the
            //                 variables userProxyName and userProxyPassword
    //                         respectively!!!
        RetCode = SAIL_LoginConsumeoneLogout(
                                            szUserName,
                                            szPassword,
                                            szProxyUserName,
                                            szProxyPassword,
                                            szComment,
                                            uiMajorVersion,
                                            uiMinorVersion,
                                            uiRevisionVersion,
                                            szApplicationID,
                                            uiConsumeRTLFrequency);
        }
        if (RetCode == SAIL SUCCESSFUL) {
    // The user has now logged into the Optimiser Online Server and
    // may now proceed with using the application.
    }else {
    // The login was not successful - handle error condition here.
        }
```

Visual Basic Pseudo Code

```
Option Explicit
Private Declare Function SAIL_LoginConsumeoneLogout _
        Lib "SAIL.dll" (ByVal szUserName As String, _
                        ByVal szPassword As String, _
                        ByVal szProxyUserName As String, _
                        ByVal szProxyPassword As String, _
                        ByVal szComment As String, _
                        ByVal uiMajorVersion As Long, _
                        ByVal uiMinorVersion As Long, _
                        ByVal uiRevisionVersion As Long, _
                        Byval szApplicationID As String), _
                        ByVal consumeRTLFrequency As Long) As Long
Dim RetCode As Long
Dim strUserName As String
Dim strPassword As String
Dim strProxyUserName As String
Dim strProxyPassword As String
Dim strApplicationID As String
DIM lngConsumeRTLFrequency As Long
    ' NOTE: The following user name and password should be replaced with
    '       a registered user name and password supplied from Optimiser
    '       and should never be hardcoded. The user must be provided with
    '       a mechanism for entering these details.
strUserName = "xxxxx";
strPassword = "yyyyy";
    ' NOTE: The following proxy user name and proxy password should be
    '       replaced with the proxy user name and proxy password
    '       supplied by the related company administrator and should never
    be '    hardcoded. The user must be provided with a mechanism for
    '       entering these details.
strProxyUserName = "aaaa";
strProxyPassword = "bbbbbb";
    ' NOTE: The following Application ID is an unique identifier which is
    '       provide by Optimiser
strApplicationID = "zzzzzzz"
' NOTE: The following is used to indicate that SAIL should
'               automatically consume an RTL every 12 hours from login.
lngConsumeRTLFrequency = 60 * 12  ' Consume RTLs every 12 Hours
RetCode = SAIL_LoginConsumeoneLogout(
                    strUserName, _
                    strPassword, _
                    ByVal 0&, _
                    ByVal 0&, _
                    "a comment", _
                    App.Major, _
                    App.Minor, _
                    App.Revision,
                    strApplicationID, _
                    lngConsumeRTLFrequency)
While ( RetCode = SAIL_PROXY_AUTH_REQUIRED )
        ' The SAIL connects to a proxy server which requires a proxy user name
```

```
' and proxy password.
' NOTE: Prompt user for proxy user name and proxy password here and
' assign their entered proxy details to the variables userProxyName
' and userProxyPassword respectively!!!
    RetCode = SAIL_LoginConsumeoneLogout(
                    strUserName, _ strPassword, _
                    strProxyUserName, _
                    strProxyPassword, _
                    "a comment", _ App.Major, _
                    App.Minor, _
                    App.Revision, _
                    strApplicationID, _
                    lngConsumeRTLFrequency)
Wend
If (RetCode = SAIL_SUCCESSFUL) Then
        ' The user has now logged into the Optimiser Online Server and
        ' may now proceed with using the application.
Else
        ' The login was not successful - handle error condition here.
End If
```

8 SAIL_GetDLLVersion

Prototype

```
UNSIGNED INT SAIL_GetDLLVersion
(
        CONST UNSIGNED INT uiBufferSize,
        CHAR * CONST clpszVersionString,
        UNSIGNED INT * CONST clpuiVersionMajor,
        UNSIGNED INT * CONST clpuiVersionMinor,
        UNSIGNED INT * CONST clpuiVersionRevision
);
```

Description

Returns the version number of the SAIL library to the calling Software Application. The Software Application can use this number to keep track and act accordingly of any interface changes to this system if this system is being used in a dynamic environment.

Parameters

| Name | Direction | |
|---|---|---|
| uiBufferSize | | The size of the string buffer to contain the SAIL version string. |
| clpszVersionString | | A pointer to a buffer to contain a null-terminated SAIL version string on return from a successful call of this operation. The pointer can be a NULL pointer. |
| clpuiVersionMajor | | A pointer to an unsigned integer, the contents of which, on return from a successful call of this operation, would indicate the Major Version number of the SAIL library. This pointer can be a NULL pointer. |
| clpuiVersionMinor | | A pointer to an unsigned integer, the contents of which, on return from a successful call of this operation, would indicate the Minor Version number of the SAIL library. This pointer can be a NULL pointer. |
| clpuiVersionRevision | | A pointer to an unsigned integer, the contents of which, on return from a successful call of this operation, would indicate the Revision Version number of the SAIL library. |

Return Value

Returns the maximum size required to be able to store the SAIL version string into the buffer in its entirety.

Remarks

None

Examples

C++ Pseudo Code

```
#define BUFFERSIZE 225
// Allocate a static space for the version string and a null
// terminating character.
CHAR szVersionString[BUFFERSIZE + 1];
UINT uiVersionMajor;
UINT uiVersionMinor;
UINT uiVersionRevision;
UINT msgLength;
// Retrieve BUFFERSIZE number of characters of the
// SAIL version string and the version release of
// the SAIL system.
msgLength = SAIL_GetDLLVersion(BUFFERSIZE,
        szVersionString,
        &uiVersionMajor,
        &uiVersionMinor,
        &uiVersionRevision);
```

Visual Basic Pseudo Code

```
Option Explicit
Private Declare Function SAIL_GetDLLVersion
    Lib "SAIL.dll" (ByVal uiBufferSize As Long, _ clpszVersionString
            As String, _
            clpuiVersionMajor As Long, _ clpuiVersionMinor As
            Long, _ clpuiVersionRevision As Long) As Long
Dim RetCode As Long Dim lngMax As Long
Dim strBuffer As String
Dim lngMajor As Long
Dim lngMinor As Long
Dim lngRevision As Long
' Return the maximum length of the SAIL version string and the
' version release of the SAIL system.
lngMax = SAILGetUDLVersion ( 0,
            ByVal 0&,
            lngMajor,
            lngMinor,
            lngRevision)
' Allocate space for the buffer and a null-terminating
' character. Clear the buffer with Chr$(0) characters.
strBuffer = String$(lngMax + 1, Chr$(0))
' Call the function again so it can fill strBuffer.
lngMax = SAIL_GetDLLVersion(lngMax,
            ByVal strBuffer,
            ByVal 0&,
```

SAIL_GetTimeOutPeriod
Prototype
UNSIGNED INT SAIL_GetTimeOutPeriod( );
Description
Returns the maximum number of milliseconds to wait for a reply from the Optimiser Online Server before a timeout condition occurs.
Parameters
None
Return Value
Returns the timeout in milliseconds.
Remarks
The default timeout period of 15000 milliseconds is returned if the timeout period has not been previously set by the SAIL_SetTimeOutPeriod( ) operation.

Examples

C++ Pseudo Code

```
UINT uiMilliSeconds;
uiMilliSeconds = SAIL_GetTimeOutPeriod( );
cout << "The current time out is " <<
    << uiMilliSeconds << " milliseconds."
    << endl;
```

Visual Basic Pseudo Code

```
Option Explicit
Private Declare Function SAIL_GetTimeOutPeriod _
    Lib "SAIL.dll" ( ) As Long
Dim lngMilliSeconds As Long
lngMilliSeconds = SAIL_GetTimeOutPeriod( )
MsgBox "The current time out period is " & _
    uiMilliSeconds & " milliseconds."
```

10 SAIL_SetTimeOutPeriod
Prototype

```
VOID SAIL_SetTimeOutPeriod
(
    CONST UNSIGNED INT uiMilliSeconds
);
```

Description
Sets the maximum number of milliseconds to wait for a reply from the Optimiser Online Server before a timeout condition is to be flagged.
Parameters

| Name | Direction | Description |
|---|---|---|
| uiMilliSeconds | In | The number of milliseconds to wait for a reply from the Optimiser Online Server before a timeout condition occurs. This value must be greater than zero milliseconds. The default is 60 seconds. |

Return Value
None
Remarks
The default timeout period is 15000 milliseconds if this operation is not invoked to set another timeout period.

Examples

C++ Pseudo Code

```
UINT uiMilliSeconds;
uiMilliSeconds = 10000;   // 10 second timeout period
SAIL_SetTimeOutPeriod(uiMilliSeconds);
```

Visual Basic Pseudo Code

```
Option Explicit
Private Declare Sub SAIL_SetTimeOutPeriod _
    Lib "SAIL.dll" (ByVal uiMilliSeconds As Long)
Dim lngTimeout As Long
lngTimeout = 15000         ' 15 second timeout period
SAIL_SetTimeOutPeriod lngTimeout
```

11 SAIL_ChangePassword
Prototype

```
SAILRETCODE SAIL_ChangePassword
(
    CONST CHAR * CONST szCurrentPassword, CONST CHAR * CONST
    szNewPassword
);
```

Description
This function allows the user to change his/hers password.
Parameters

| Name | Direction | Description |
|---|---|---|
| szCurrentPassword | In | A pointer to a null-terminated character string specifying the current password of the user. This pointer must not be NULL pointer. |
| szNewPassword | In | A pointer to a null-terminated character string specifying the new password for the user. This pointer must not be NULL pointer. |

Return Value
Returns an error code or SAIL_SUCCESSFUL if the operation was successful. Use SAIL_GetErrorMessage ( ) to return a textual representation of the error code.
The developer should test for the following return values and perform the appropriate action:

| Error Code | Description | Action |
|---|---|---|
| SAIL_SUCCESS | The operation was successful. | The Software Application may now |

-continued

| Error Code | Description | Action |
|---|---|---|
| SAIL_PASSWORDDENIED | The Optimiser Online Server denied the request to change the password | proceed with further execution. The Software Application should report to the user that the change has been denied by the server. |
| SAIL_PASSWORDBAD | The Optimiser Online Server denied the request to change the password. This might be due to the password length or wrong characters used. | The Software Application should report to the user that it is a bad password and the change has been denied by the server. |

Examples

C++ Pseudo Code

```
// NOTE: The following user passwords should never be hardcoded,
//       the user must be provided with a mechanism for entering
//       these details.
CHAR currentPassword [ ] = "xxxxx";
CHAR newPassword [ ] "yyyyy" ;
SAILRETCODE RetCode;
RetCode = SAILChangePassword(currentPassword; newPassword);
if (RetCode == SAIL_SUCCESSFUL) {
    // Inform user that password has been changed
} else {
    // Inform user that password change was not successful
}
```

Visual Basic Pseudo Code

```
Option Explicit
Private Declare Function SAIL_ChangePassword _
    Lib "SAIL.dll" (ByVal currentPassword As String, _ ByVal
        newPassword As Long) As Long
Dim RetCode As Long
Dim strNewPassword As String
Dim strCurrentPassword As String
' NOTE: The following user passwords should never be hardcoded,
'       the user must be provided with a mechanism for entering
'       these details.
strCurrentPassword = "xxxxx" strNewPassword = "yyyyyy"
RetCode = SAIL_ChangePassword(strCurrentPassword, strNewPassword)
If (RetCode = SAIL_SUCCESSFUL) Then
    ' Inform user that password has been changed
Else
    ' Inform user that password change was not successful
End If
```

12 SAIL_SetHeartBeatFrequency

Prototype

```
VOID SAIL_SetHeartBeatFrequency
    (
        CONST UNSIGNED INT uiMinutes
    );
```

Description

Sets the frequency to signal the server that the application is still active. This signal prevent the disconnection of the network connection.

Parameters

| Name | Direction | Description - |
|---|---|---|
| uiMinutes | In | The number of minutes before sending another signal to the server |

Return Value

None

Remarks

The default frequency is 5 minutes if this operation is not invoked to set another frequency period.

The HeartBeat is a separate thread that initiates a message on time intervals. This HeartBeat thread will not be created if the SAIL_SetHeartBeatFrequency is set to 0 before the SAIL_Login function call.

Examples

C++ Pseudo Code

```
UINT uiSeconds;
uiMinutes = 10;   // 10 minutes
SAIL_SetHeartBeatFrequency(uiMinutes);
```

Visual Basic Pseudo Code

```
Option Explicit
Private Declare Sub SAIL_ SetHeartBeatFrequency _
    Lib "SAIL.dll" (ByVal uiMinutes As Long)
Dim lngHeartBeat As Long
lngHeartBeat = 10           ' 10 minutes timeout period
SAIL_SetHeartBeatFrequency lngHeartBeat
```

13 SAIL_GetHeartBeatFrequency

Prototype

UNSIGNED INT SAIL_GetHeartBeatFrequency( );

Description

Returns the number of minutes to which the HeartBeat is set.

Parameters

None

Return Value

Returns the frequency in minutes.

Remarks

The default frequency of 5 minutes is returned if the frequency has not been previously set by the SAIL_SetHeartBeatFrequency( ) operation.

Examples

C++ Pseudo Code

```
UINT uiMinutes;
uiMinutes = SAIL_GetHeartBeatFrequency( );
cout << "The current frequency is " << uiMinutes << " minutes."
     << endl;
```

Visual Basic Pseudo Code

```
Option Explicit
Private Declare Function SAIL_GetHeartBeatFrequency _
    Lib "SAIL.dll" ( ) As Long
Dim lngMinutes As Long
lngMinutes = SAIL_ GetHeartBeatFrequency( )
MsgBox "The current time out period is " & _
    lngMinutes & " minutes."
```

14 SAIL_AccountBalance
Prototype

```
SAILRETCODE SAILAccountBalance
    (
        UNSIGNED INT * CONST uiAccountBalance
    ) ;
```

Description
Returns the balance of the Optimiser Online account.
Parameters

| Name | Description |
|---|---|
| uiAccountBalance | In A pointer to an integer that contains the Optimiser Online account balance. The content of the integer will be modified by the operation to the value of the account balance. This pointer must not be NULL pointer. |

Return Value
Returns an error code or SAIL_SUCCESSFUL if the operation was successful. Use SAIL_GetErrorMessage ( ) to return a textual representation of the error code.
Remarks
None Examples C++ Pseudo Code

```
char * userName;
char * userPassword;
char * proxyUserName;
char * proxyPassword;
unsigned int majorVersion, minorVersion, revisionVersion;
char applicationID[ ] = "abcdefghijklm";
int errCode;
unsigned int accBalance;
errCode = SAIL_Login(
    userName, userPassword,
    proxyUserName, proxyPassword,
    majorVersion, minorVersion, revisionVersion,
    applicationID,
    0, NULL);
errCode = SAIL_AccountBalance(&accBalancel);
cout << "Account Balance :" << accBalance << endl;
```

Visual Basic Pseudo Code

```
Option Explicit
Private Declare Function SAIL_AccountBalance _
    Lib "SAIL.dll" (AccountBalance As Long) As Long
Dim lngAccountBalance As Long
errCode = SAIL_AccountBalance(lngAccountBalance)
MsgBox "Account Balance :" & lngAccountBalance
```

Flag Settings for Compilation and Linking
SAIL is a multi-threaded library and requires the following flag setting at compile time.
1 Windows

| Flag | Meaning |
|---|---|
| /MD | Defines _MT and _DLL so that both multithread and DLL-specific versions of the run-time routines are selected from the standard .H files. This option also causes the compiler to place the library name MSVCRT.LIB into the .OBJ file. Applications compiled with this option are statically linked to MSVCRT.LIB. This library provides a layer of code that allows the linker to resolve external references. The actual working code is contained in MSVCRT.DLL, which must be available at run time to applications linked with MSVCRT.LIB. |

2 SunOS 5

| Flag | Meaning |
|---|---|
| mt | Specify options needed when compiling multi-threaded code. |
| lsocket | The socket library required for network calls. |
| lnsi | The network services library required by lsocket. |

3 Notes
Having more than one copy of the run-time libraries in a process can cause problems, because static data in one copy is not shared with the other copy. To ensure that your process contains only one copy, avoid mixing static and dynamic versions of the run-time libraries. The linker will prevent you from linking with both static and dynamic versions within one .EXE file, but you can still end up with two (or more) copies of the run-time libraries. For example, a dynamic-link library linked with the static (non-DLL) versions of the run-time libraries can cause problems when used with an .EXE file that was linked with the dynamic (DLL) version of the run-time libraries.
System Settings
1 All Platforms
SAIL can be configured through the setting environment variables prior to executing a SAIL-enabled Software Application. The environment variables that SAIL uses are as follows:

| System Variable Name | Description |
|---|---|
| HTTP_PROXY | If the SAIL enabled Software Application resides behind an HTTP proxy server then setting this variable will instruct SAIL to direct communication through the specified HTTP proxy. The value of this variable should be of the form: <proxy host name>:<proxy port number> Where <proxy host name> is the name of the host acting as proxy and <proxy port number> is the port on which the proxy is listening. Example values are: proxy.mydomain.com:8080 192.168.1.1:80 |
| SAIL_HOST_NAME | If this environment variable is set then SAIL will establish a connection to the host specified in the variable's value. If this variable has not been set then SAIL will connect to the Optimiser Online Server at salmon.optimiser.com.au. |
| SAIL_PORT_NUMBER | If this environment variable is set then SAIL will establish a connection to the port specified in the variable's value. If this |

-continued

| System Variable Name | Description |
| --- | --- |
| | variable has not been set then SAIL will connect to port 80. |

2 Windows System Settings

If the HTTP_PROXY environment variable has not been set, then SAIL will determine from the Registry whether an enabled HTTP proxy has been entered for the current user. These settings can be configured through the Internet applet found in Control Panel.

If the registry settings do not exist or the proxy setting has been found disabled, then SAIL will not use a proxy to establish a connection to the Optimiser Online Server. SAIL will establish a connection to the Optimiser Online Server directly.

Return Codes

The return codes are listed in the SAIL.H file. The most common error codes and their meanings are listed as follows:

| Error Code | Description |
| --- | --- |
| SAIL_SUCCESS | The operation was successful. |
| SAIL_PROXY_AUTH_REQUIRED | The developer should prompt the user for their proxy username and proxy password. Another SAIL_Login ( ) operation should be called with the parameters szProxyUserName and szProxyPassword set to the data entered by the user. |
| SAIL_ALREADYLOGGEDIN | The operation failed because an attempt was made to re-login without logging out the current login session. |
| SAIL_NOTLOGGEDIN | The opemtion failed because a login session has not been established. |
| SAIL_WRONGNAMEPASSWORD | The user entered the wrong user name and/or password. |
| SAIL_SERVERDENIESREQUEST | The Optimiser Online Server denied the request for consuming more RTLs from the user's account. Possible causes could be: There are insufficient RTLs in the user's Optimiser Online account to consume the required amount. The Software Application is not registered with Optimiser Online. |
| SAIL_INSUFFICIENT_RTLs_LEFT | There are insufficient RTLs in the user's account to allow the Software Application to continue running |

APPENDIX 3

The Following is Scenarios of how the SAIL Library could be Used:

Scenario1—MS Word

MicroSoft could say that people should pay them $1 for every hour someone uses the MS Word. They could also say that every time one uses the Table functionality they should pay two dollars. The implementation of SAIL would be as follows:

Step1 At the beginning of the program display a login screen asking the user for his User Name and Password as registered in the SALMON server Step2 Use the SAIL_Login api as follows directly after the login screen errCode=SAIL_Login(userName, user
  Password, . . . , . . . , . . . , . . . , . . . , . . . ,
  applicationID,
  60, "Time charge");
where: userName and UserPassword has been retrieved from the login screen application ID is a identifier created in SALMON
60, "Time charge" this will charge $1 every 60 minutes Step3 Validate the return code, errCode, from SAIL_Login.
  If it is successful continue with application otherwise call SAIL_ErrMessage to display the Error message. The error message could be something like "Wrong User Name Password" etc Step4 In the code where it handles the event from "Insert Table" in MS Word they should insert a SAIL_onsumeRTL api as follows
  errCode=SAIL_ConsumeRTL(2, "Table Function Used");
  where: 2 is the amount of dollars charged for this function and "Table Function Used" is the information logged in SALMON Step5 Validate the return code, errCode, from SAIL_ConsumeRTL.
  If it is successful continue with application otherwise call SAIL_ErrMessage to display the Error message. The error message could be something like "Insufficient funds in account" etc Step6 In the code where it handles the event from "File→Exit" in MS Word they should insert a SAIL Logout api as follows
  SAIL_Logout( );

Scenario2—Game

Company ABC Pty(Ltd) develops a game that has different stages which get charged as following:
  Stage 1: Entry Level—No Charge
  Stage 2: Charge $2 on entry of this stage 1 and play Unlimited time
  Stage 3: Charge $3 on entry of this stage 1 and play Unlimited time The implementation of SAIL would be as follows:

Step1 At the beginning of the program display a login screen asking the user for his User Name and Password as registered in the SALMON server.

Step2 Use the SAIL_Login api as follows directly after the login screen
  errCode=SAIL_Login(userName, user
  Password, . . . , . . . , . . . , . . . , . . . , applicationlD,
  0, NULL);
  where: userName and UserPassword has been retrieved from the login screen application ID is a identifier created in SALMON Step3 Validate the return code, errCode, from SAIL_Login.
  If it is successful continue with application otherwise call SAIL_ErrMessage to display the Error message. The error message could be something like "Wrong User Name Password" etc Step4 In the code where it handles the event from "Start Stage 2" in games menu they should insert a SAIL_onsumeRTL api as follows
  errCode=SAIL_ConsumeRTL(2, "Game ABC Stage 2");
  where: 2 is the amount of dollars charged to this account for this stage and "Game ABC Stage 2" is the information logged in SALMON Step5 Validate the return code, errCode, from SAIL_ConsumeRTL.
If it is successful continue with application otherwise call SAIL_ErrMessage to display the Error message. The error message could be something like "Insufficient funds in account" etc Step6 In the code where it handles the event from "Start Stage 3" in games menu they should insert a SAIL_onsumeRTL api as follows
errCode=SAIL_ConsumeRTL(3, "Game ABC Stage 3");
Where: 3 is the amount of dollars charged to this account for this stage and "Game ABC Stage 3" is the information logged in SALMON Step7 Validate the return code, errCode, from SAIL_ConsumeRTL.
If it is successful continue with application otherwise call SAIL_ErrMessage to display the Error message. The error message could be something like "Insufficient funds in account" etc Step8 In the code where it handles the event from "File→Exit" in the Game they should insert a SAIL_Logout api as follows
SAIL_Logout( );

Scenario3—Accounting Program
Company XYZ Pty(Ltd) developed an accounting package and want to charge people $2 per hour usage.
The implementation of SAIL would be as follows:

Step 1 At the beginning of the program display a login screen asking the user for his User Name and Password as registered in the SALMON server.

Step2 Use the SAIL_LoginConsumeoneLogout api as follows directly after the login screen
errCode=SAIL_LoginConsumeoneLogout(userName, userPassword, . . . , . . . , "MYO Accounts" . . . , . . . , . . . , applicationID, 60);
where: userName and UserPassword has been retrieved from the login screen, "MYO Accounts" is a message that is logged on the server, application ID is a identifier created in SALMON, 60 is the amount of minutes before he will be charged again.

Step3 In the code where it handles the event from "File→Exit" in the Game they should insert a SAIL_Logout api as follows SAIL_Logout( );

The invention claimed is:

1. A method of authorising use of a computer program, said method comprising the steps of:
providing an authorisation system running on a server;
recording on the server computer program identification information associated with the computer program;
registering login identification information at the authorisation system to uniquely identify a user;
receiving a login request message from the user to use the computer program, the login request message including the computer program identification information and the login identification information;
verifying an identity of the user from the login identification information and checking that the user is authorised to use the computer program identified by the computer program identification information;
upon verification of the identity of the user and that the user is authorised to use the computer program, then sending a login authorisation message to the computer program;
receiving a use message from the user indicating that the computer program is being used after the authorisation message is sent to the user; and
recording the use message on the server;
wherein at the end of a period of time specified in the computer program from the last authorisation, a request to charge usage units is sent to the authorising system for a further authorisation, the authorisation system thereafter sending each further authorisation and recording the use for each period, whereby a charge is generated for each authorisation message sent.

2. The method according to claim 1, wherein the computer program is a sub-component of a software application.

3. The method according to claim 1, wherein the authorization system is at a location remote from the user.

4. The method according to claim 1, further comprising:
upon verification of the identify of the user and that the user is authorised to use the computer program, charging the user an amount of money.

5. The method according to claim 1, wherein said login request message is encrypted.

6. The method according to claim 1, wherein said login authorisation message is encrypted.

7. The method according to claim 1, further comprising:
sending the login identification information from the authorisation system to the user.

* * * * *